(12) United States Patent
Ishikawa et al.

(10) Patent No.: US 7,244,919 B2
(45) Date of Patent: Jul. 17, 2007

(54) SEMICONDUCTOR INTEGRATED CIRCUIT DEVICE HAVING PHOTO DETECTOR CIRCUITS, PROCESSING ELEMENTS, AND COMPARING CIRCUITS WHICH COMPARE THE OUTPUT OF A PHOTO DETECTOR ELEMENT WITH A REFERENCE VOLTAGE

(75) Inventors: Masatoshi Ishikawa, Kashiwa (JP); Idaku Ishii, Koganei (JP); Takashi Komuro, Tokyo (JP); Shingo Kagami, Tokyo (JP)

(73) Assignee: Semiconductor Technology Academic Research Center, Yokohama-shi (JP)

( * ) Notice: Subject to any disclaimer, the term of this patent is extended or adjusted under 35 U.S.C. 154(b) by 0 days.

(21) Appl. No.: 11/289,696

(22) Filed: Nov. 30, 2005

(65) Prior Publication Data
US 2006/0081765 A1    Apr. 20, 2006

Related U.S. Application Data

(62) Division of application No. 10/200,332, filed on Jul. 23, 2002.

(30) Foreign Application Priority Data

Jan. 25, 2002    (JP) .............................. 2002-017665

(51) Int. Cl.
   *H01L 27/00* (2006.01)
(52) U.S. Cl. .................................... 250/208.1; 341/164
(58) Field of Classification Search ............. 250/208.1; 341/161, 164, 132, 133
See application file for complete search history.

(56) References Cited

U.S. PATENT DOCUMENTS

| | | | |
|---|---|---|---|
| 3,855,589 A * | 12/1974 | Solender ..................... 341/139 |
| 5,027,117 A * | 6/1991 | Yoshida et al. ............. 341/132 |
| 5,253,308 A | 10/1993 | Johnson |
| 5,703,800 A | 12/1997 | Ninomiya et al. |
| 5,898,881 A | 4/1999 | Miura et al. |
| 6,525,304 B1 * | 2/2003 | Merrill et al. ........... 250/208.1 |
| 6,608,296 B1 | 8/2003 | Toyoda et al. |
| 6,642,503 B2 * | 11/2003 | Kummaraguntla et al. ...... 250/214.1 |

FOREIGN PATENT DOCUMENTS

| | | |
|---|---|---|
| JP | A 61-208561 | 9/1986 |
| JP | A 08-171538 | 7/1996 |
| WO | WO 00/21284 | 4/2000 |

OTHER PUBLICATIONS

M. Ishikawa et al., "Imaging and Information Technology of 2001 Digital Vision Chip and Applications thereof", Monthly Journal of Imaging and Information Technology, Dec. 2001, vol. 33, pp. 2-3, and 35-43.

(Continued)

*Primary Examiner*—Thanh X. Luu
(74) *Attorney, Agent, or Firm*—Finnegan, Henderson, Farabow, Garrett & Dunner, L.L.P.

(57) ABSTRACT

A semiconductor integrated circuit device is provided which has a plurality of photo detector circuits and a plurality of processing elements. Each of the photo detector circuits includes a comparing circuit, which compares an output of a photo detector element with a reference voltage. A/D conversion is performed by counting the elapsed time until the output of the photo detector element drops below the reference voltage, and a level of the reference voltage as a function of time to be applied to the comparing circuit and time intervals of the counting are uniquely determined based on given quantization intervals of an amount of current generated by the photo detector element. In addition, the photo detector elements may be reset locally based on the result of the corresponding processing element.

7 Claims, 25 Drawing Sheets

OTHER PUBLICATIONS

Notice of Reasons for Rejection, Japanese Patent Application No. 2002-017665, dated Dec. 2, 2005.

Komuro, T. et al., "Design of General Purpose Vision Chip with PE blocking function", Technical Report of IEICE, vol. 101 No. 246, pp. 9-16, (Aug. 2, 2001).

Komuro, T. et al., "High Speed Target Tracking Vision Chip", Int. Conf. on Computer Architecture for Machine Perception, pp. 49-56, (Sep. 11, 2000).

J. Ohta et al., "Pulse-Modulated Vision Chips with Versatile-Interconnected Pixels", IPDPS Workshops, 2000, pp. 1063-1071.

A. Astrom et al., "Intensity Mappings Within the Context of Near-Sensor Image Processing", IEEE, 1998, pp. 1736-1741.

* cited by examiner

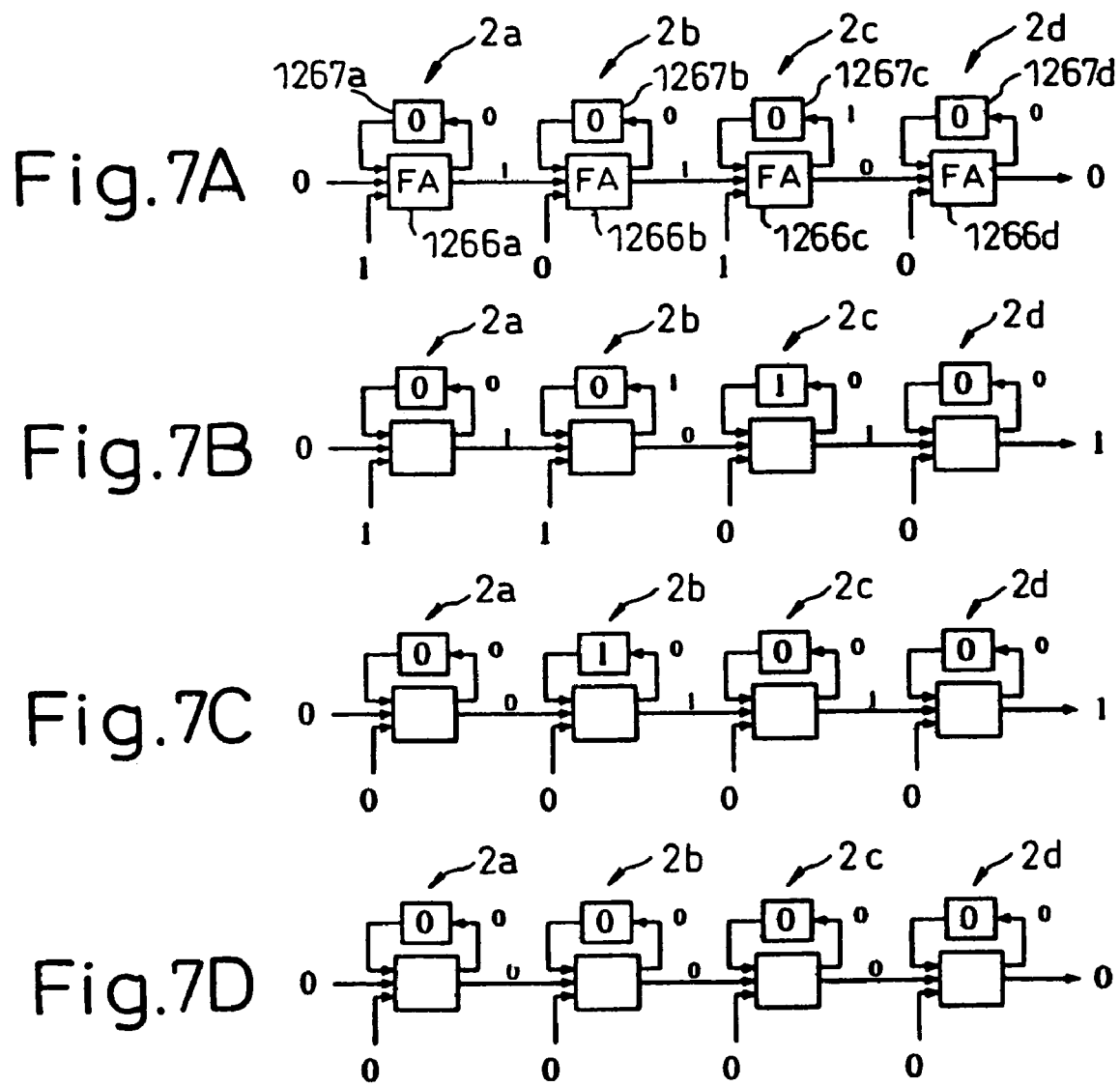

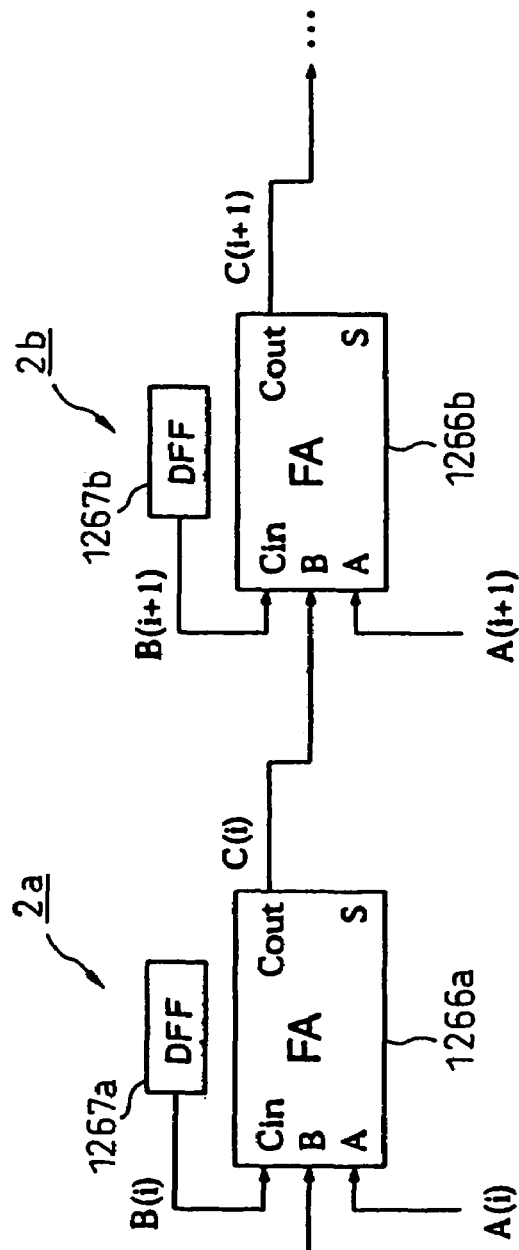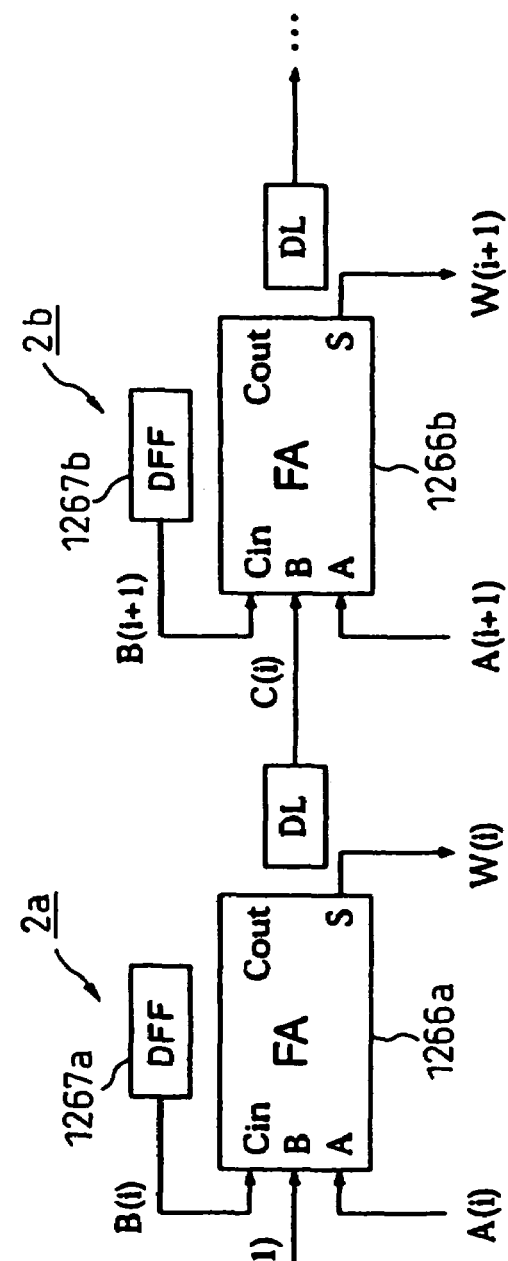

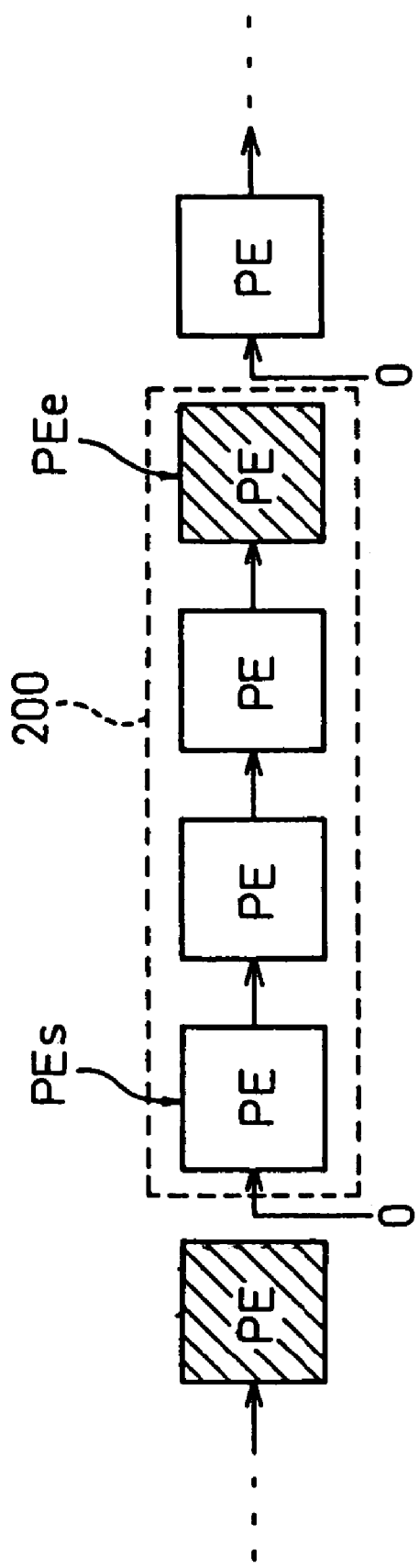

```
int i;
parallel img_a,img_b;
block idx,max,cor;

max = 0;
for(i=0; i<N; i++){
   cor = SAD(img_a,img_b);
   if (max < col) {
      idx = i;
      max = col;
setdirection(i); /* spiral */
shift(img_a);
```

| i | 0 | 1 | 2 | 3 | 4 | 5 | 6 | 7 | 8 | 9 | 10 | 11 | 12 | 13 | ... |
|---|---|---|---|---|---|---|---|---|---|---|----|----|----|----|-----|
| DIRECTION | ↓ | → | ↑ | ↑ | ← | ← | ↓ | ↓ | ↓ | → | → | → | ↑ | ↑ | |

| 18 | 14 |
|----|----|
| 22 | 10 |

RESULT (idx)

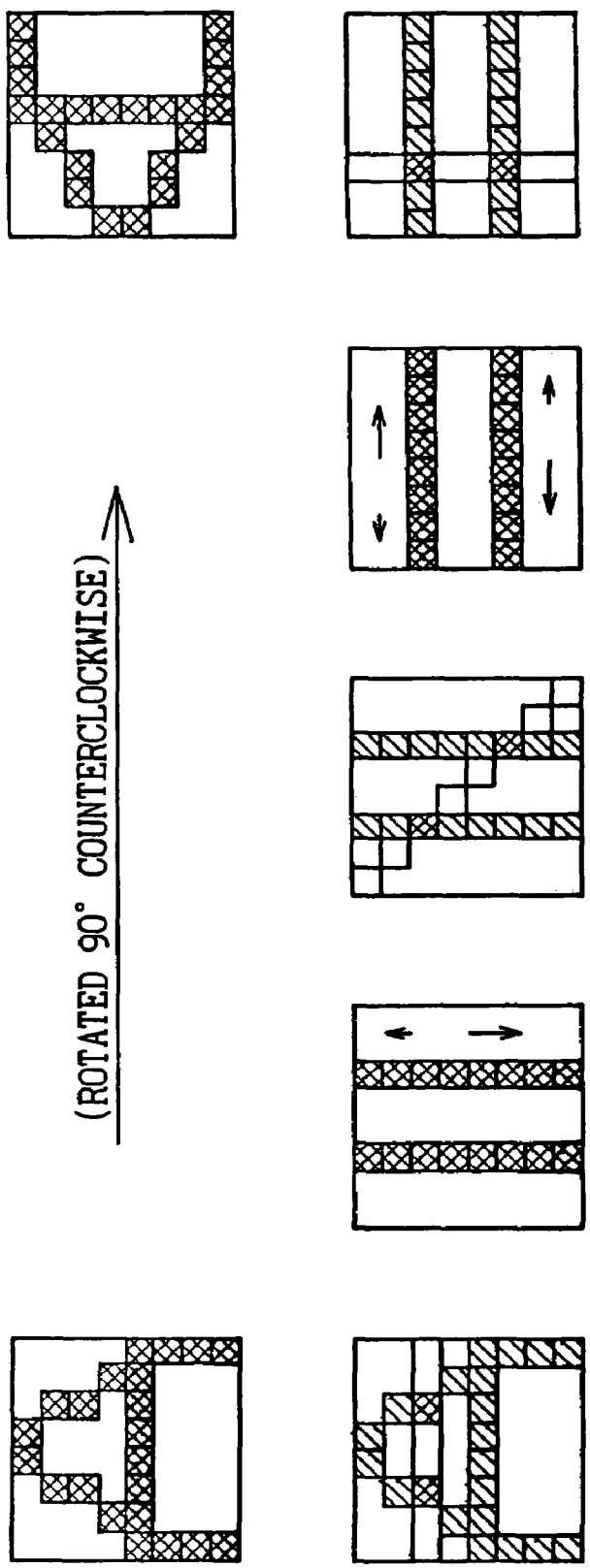

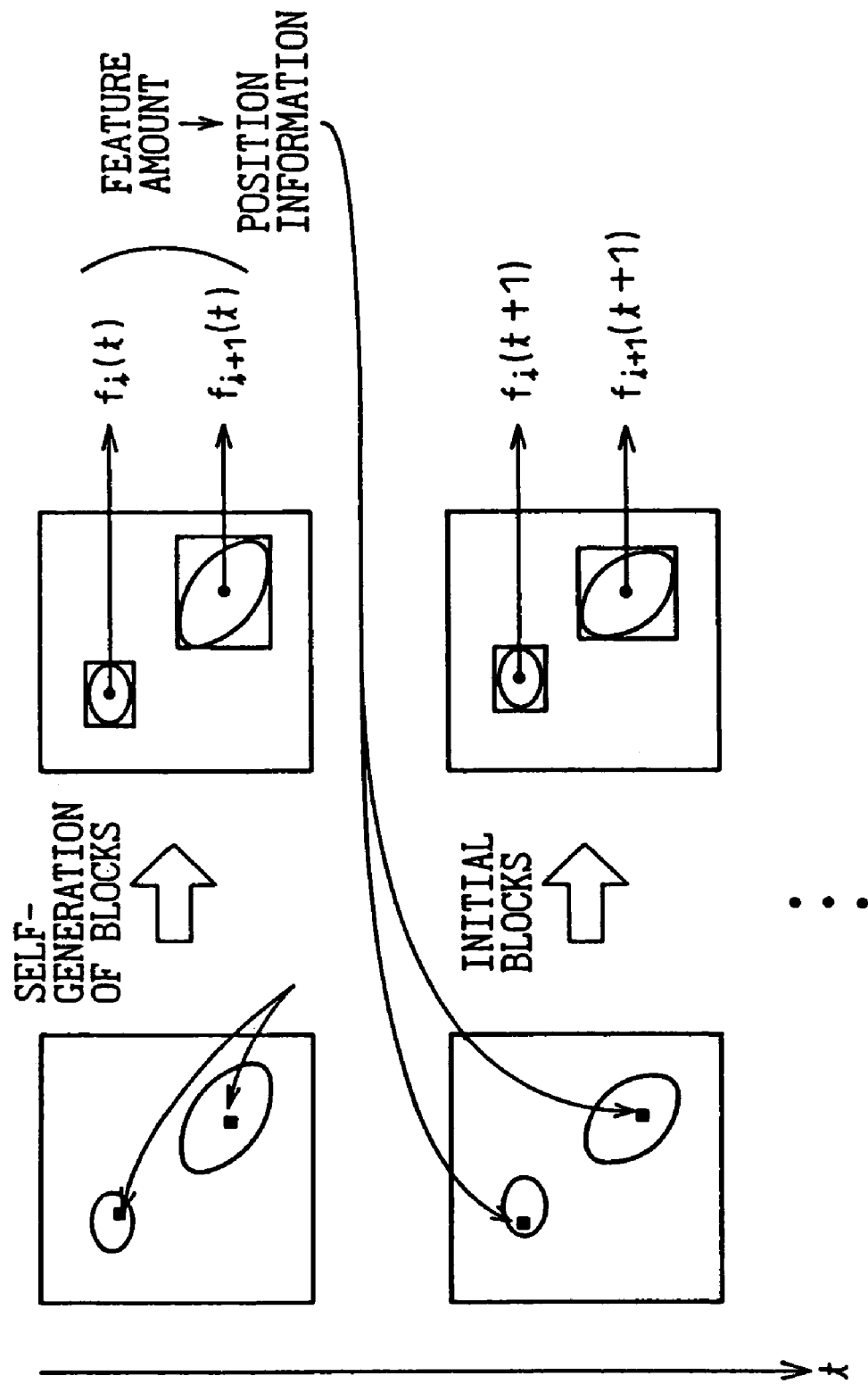

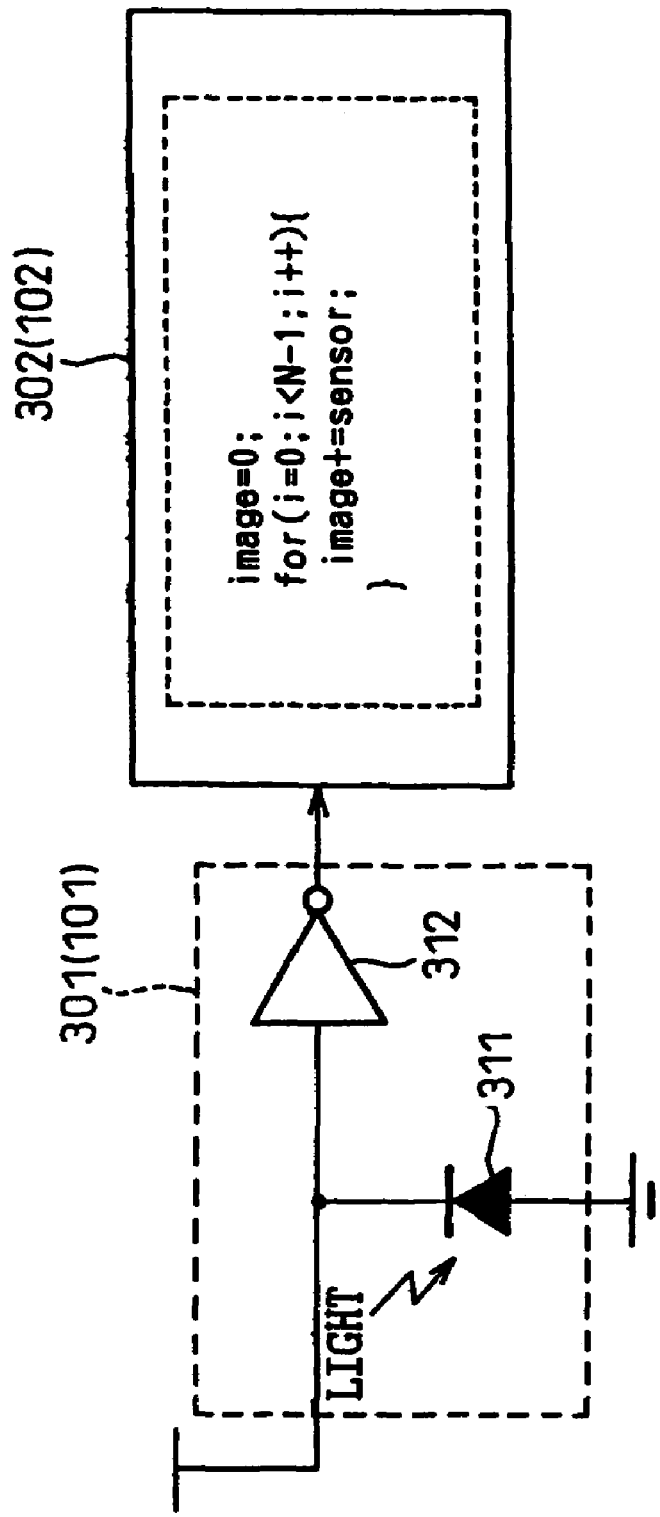

SEMICONDUCTOR INTEGRATED CIRCUIT DEVICE HAVING PHOTO DETECTOR CIRCUITS, PROCESSING ELEMENTS, AND COMPARING CIRCUITS WHICH COMPARE THE OUTPUT OF A PHOTO DETECTOR ELEMENT WITH A REFERENCE VOLTAGE

CROSS REFERENCE TO RELATED APPLICATIONS

This application is a divisional of U.S. application Ser. No. 10/200,332, filed Jul. 23, 2002, the contents of which are incorporated herein by reference.

BACKGROUND OF THE INVENTION

1. Field of the Invention

The present invention relates to a semiconductor integrated circuit device, and more particularly, to a vision chip having a plurality of photo detectors (PD's) and processing elements (PE's).

2. Description of the Related Art

A variety of image processors dedicated to image processing tasks have been researched, developed, and proposed, and many of these processors incorporate a mechanism for performing some kind of parallel computation. For example, in a massively parallel processor whose degree of parallelism amounts to tens of thousands, and in which one PE (processing element) is assigned to each pixel or each group of a small number of pixels, certain kinds of image processing tasks can be performed efficiently by performing SIMD (Single Instruction Stream Multi Data Stream) type control in which the same instruction is executed simultaneously on the plurality of PE's.

Previously, such an image processor has almost always been built from a large-scale computer of a super computer class, but in recent years, with advances in semiconductor integration technology, and with growing need to handle image processing with more ease, work has been proceeding to implement such a processor on a single chip. Further, research on a device called a vision chip, on which not only processors but also PD's (photo detectors) are accommodated, has been attracting attention.

In prior known vision chips and image processing SIMD processors (semiconductor integrated circuit devices), there has been a tradeoff between the performance of each PE and the number of pixels, and it has been difficult to achieve a semiconductor integrated circuit having high versatility. Furthermore, as the structure is unfit for global computations, the device has not been able to efficiently perform processing for extracting scalar quantities from a two-dimensional pattern.

More specifically, as the ALU used in each PE in prior known vision chips is one that simply performs computations based only on data within the PE or takes outputs of neighboring PE's as its inputs, the computation capability that can be implemented is limited to local computations in which computations are performed based on data from the PE itself and its neighboring PE's. If global computations are to be implemented without disrupting the orderly arrayed structure of the vision chip, additional circuitry such as adders will become necessary, resulting in increased amount of circuitry. This runs counter to the need to reduce the amount of circuitry as much as possible for a vision chip which requires accommodating as many pixels as possible, in a limited chip area.

Furthermore, in prior known vision chips, the range of processing that can be achieved has been limited because the computation capability of each PE and the capacity of memory mounted are finite. There is a dilemma here in that if the computation capability and the capacity of memory mounted are increased in order to increase the versatility of the vision chip, then the chip area will increase.

There is thus a need to provide a semi-conductor integrated circuit device that achieves high versatility without entailing a reduction in the number of pixels (the number of PE's that can be accommodated).

The prior art and its associated problems will be described later with reference to accompanying drawings.

SUMMARY OF THE INVENTION

An object of the present invention is to provide a semiconductor integrated circuit device that achieves high versatility without entailing a reduction in the number of pixels (without entailing an increase in the area occupied by each PE). Another object of the present invention to provide a semiconductor integrated circuit device that can perform A/D conversion of photo detector output signals without requiring additional circuitry, and can achieve flexible sensing.

According to the present invention, there is provided a semiconductor integrated circuit device having a plurality of processing elements accommodated on a single semiconductor chip, comprising a latch circuit provided at an output of each of the processing elements; and a selecting circuit selecting an input source from a group consisting of upper, lower, left, and right processing elements and a zero signal.

The semiconductor integrated circuit device may further comprise a control circuit controlling the processing element selected by the selecting circuit, based on coordinate position information of each of the processing elements. The semiconductor integrated circuit device may carry out a multi-bit operation in real time.

The semiconductor integrated circuit device may carry out an accumulating operation in real time. The semiconductor integrated circuit device may further comprise a plurality of photo detectors, and wherein each of the processing elements may process an output of a corresponding one of the photo detectors.

According to the present invention, there is also provided a semiconductor integrated circuit device having a plurality of processing elements and a communication circuit interconnecting the processing elements, wherein a resource in a first processing element is used as a resource in an arbitrary second processing element through the communication circuit.

A plurality of the processing elements may be coupled together as a block forming a processing element group. Each of the processing elements may comprise an ALU and a memory, and prescribed processing may be carried out using the plurality of ALU's and memories contained in the processing element group formed as a block. The configuration and size of the block to be constructed by coupling a plurality of the processing elements may be made dynamically variable.

Each of the processing elements may comprise a connection control circuit controlling a connection to a neighboring processing element. The connection control circuit may select a neighbor communication input source from a group consisting of upper, lower, left, and right processing elements and a zero signal.

The processing element group formed as a block may carry out a multi-bit operation in real time. The processing element group formed as a block may carry out an accumulating operation in real time.

The plurality of processing elements may be arranged in a matrix array, and the communication circuit may comprise a column bus and a row bus and transmits prescribed information to each of the processing elements. The prescribed information may be coordinate information for each of the processing elements.

The semiconductor integrated circuit device may be an SIMD processor. The semiconductor integrated circuit device may be a vision chip in which each of the processing elements processes an output of a corresponding photo detector. The semiconductor integrated circuit device may be constructed as a single semiconductor chip.

Further, according to the present invention, there is provided a semiconductor integrated circuit device having a plurality of photo detector circuits and a plurality of processing elements, wherein each of the photo detector circuits includes a comparing circuit comparing an output of a photo detector element with a reference voltage, and A/D conversion is performed by counting the time elapsing until an output of the comparing circuit drops below the reference voltage.

A level of the reference voltage to be applied to the comparing circuit may be made variable. The level of the reference voltage to be applied to the comparing circuit may be variably controlled by software. The level of the reference voltage to be applied to the comparing circuit may be specified based on a predefined table.

A count interval at which is counted the time elapsing until the output of the comparing circuit drops below the reference voltage may be made variable. The count interval may be variably controlled by software. The count interval may be specified based on a predefined table.

Resetting of the photo detector element may be done for each of the photo detector circuits. The A/D conversion may be performed using an ALU and a memory contained in each of the processing elements. The semiconductor integrated circuit device may be a vision chip, and each of the processing elements may be coupled to a corresponding one of the plurality of photo detector circuits. The semiconductor integrated circuit device may be constructed as a single semiconductor chip.

BRIEF DESCRIPTION OF THE DRAWINGS

The present invention will be more clearly understood from the description of the preferred embodiments as set forth below with reference to the accompanying drawings, wherein:

FIGS. 7A, 7B, 7C, and 7D are diagrams for explaining a summing operation in one example of the vision chip according to the first embodiment of the present invention;

FIGS. 8A and 8B are diagrams for explaining a multi-bit operation in one example of the vision chip according to the first embodiment of the present invention;

FIG. 9 is a diagram (part 1) for explaining a PE block forming process in one example of the vision chip according to the first embodiment of the present invention;

FIG. 15 is a diagram for explaining 90-degree rotation processing where one example of the vision chip according to the first embodiment of the present invention is applied;

FIG. 16 is a diagram for explaining simultaneous tracking of a plurality of objects where one example of the vision chip according to the first embodiment of the present invention is applied;

FIG. 17 is a diagram for explaining a configuration for performing A/D conversion of a photodiode output in one example of a prior art vision chip;

DESCRIPTION OF THE PREFERRED EMBODIMENTS

Before describing the embodiments of the present invention in detail, a prior art semiconductor integrated circuit device (vision chip) and its associated problems will be described first with reference to the drawings.

In the prior art design of a semiconductor integrated circuit device (vision chip) having a compact PE for each pixel, the tradeoff point between the performance of each PE and the number of pixels has been fixed; therefore, if the device has to be designed so as to be able to serve every conceivable application, the device has had to be overly designed for standard applications. Furthermore, as the structure of the prior art semiconductor integrated circuit device is unfit for global computations, it has not been possible to efficiently perform processing for extracting scalar quantities from a two-dimensional pattern, the processing being indispensable to the real-time application of image processing.

Figure 1:
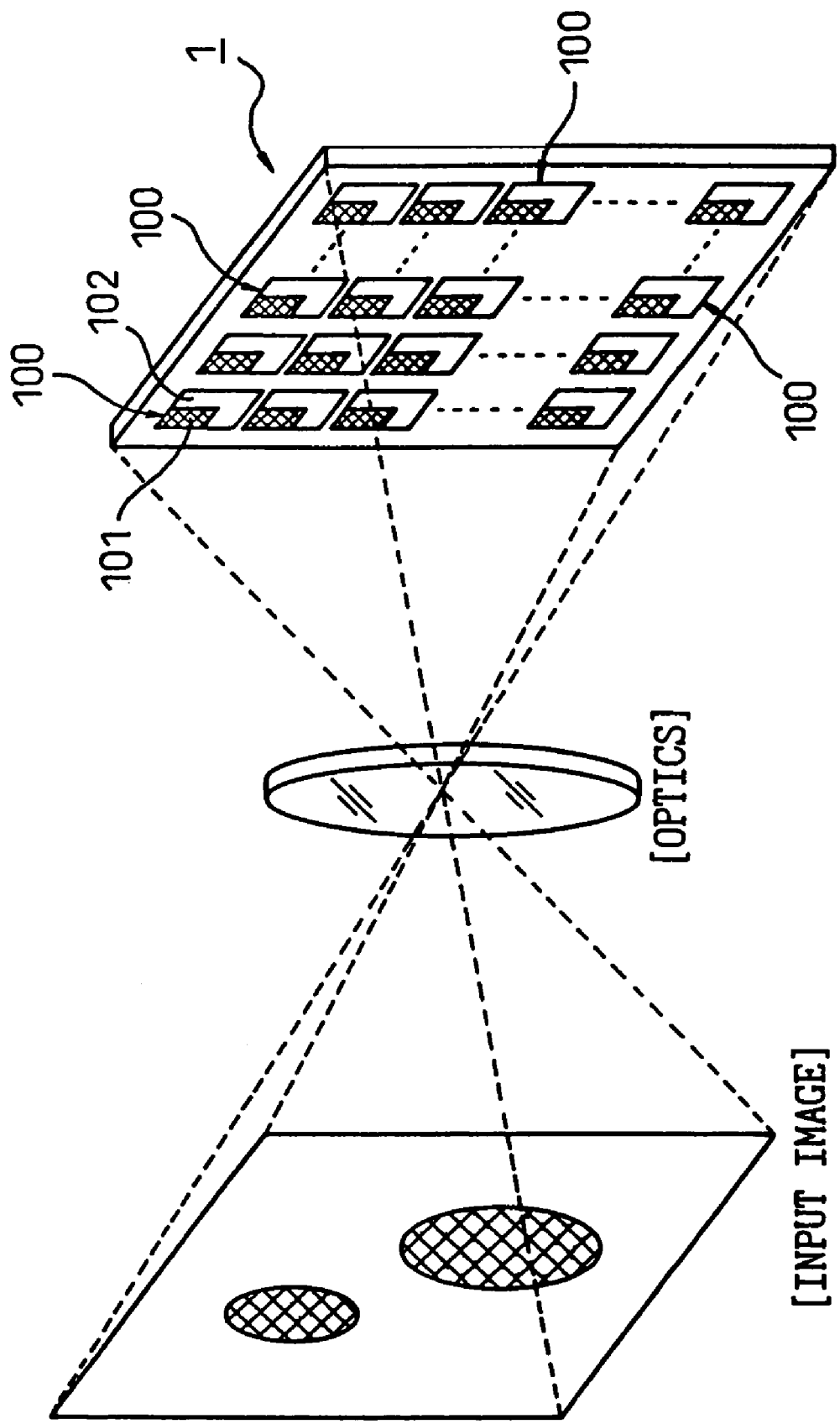
FIG. 1 is a diagram conceptually showing a vision chip.
Figure 2:
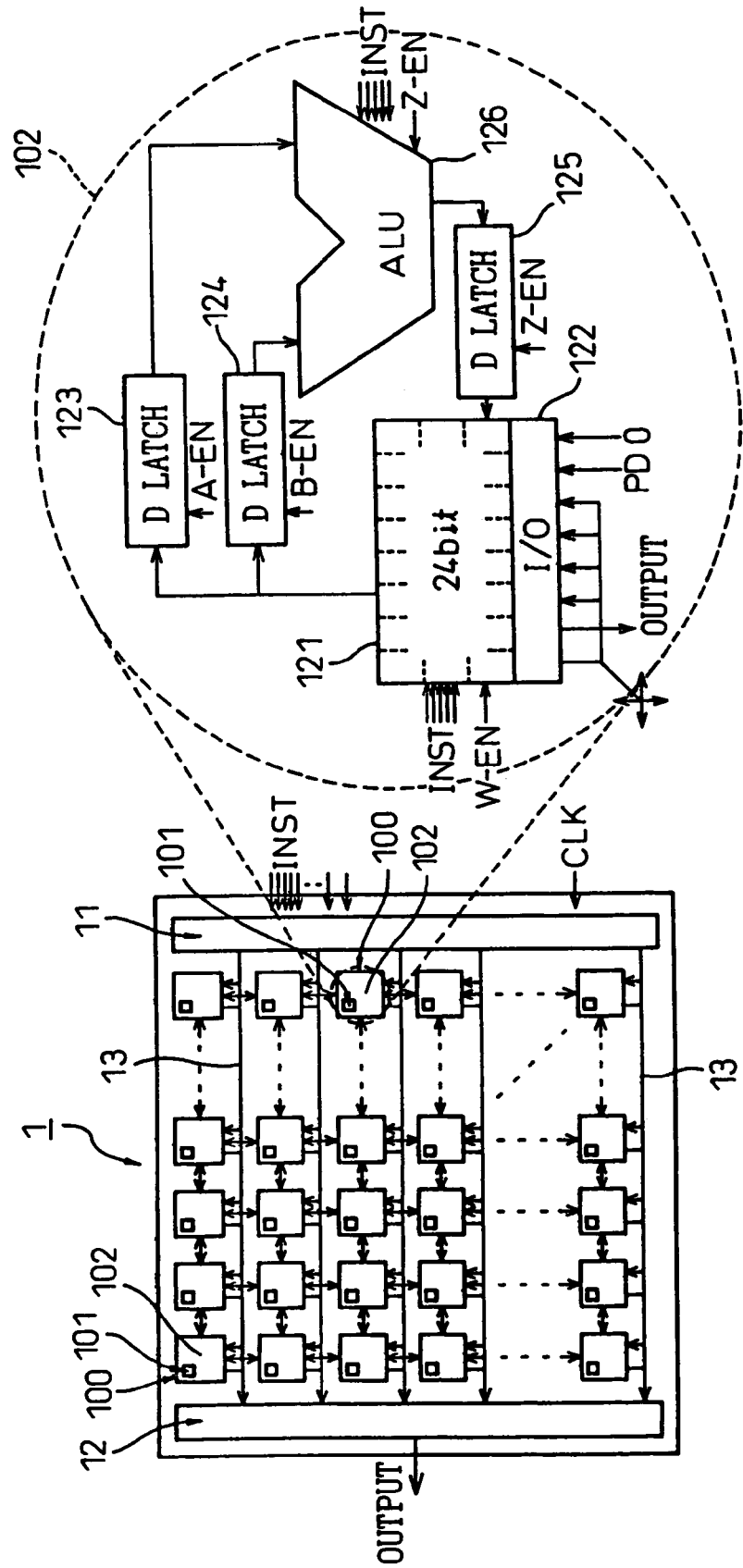
FIG. 2 is a diagram for explaining the architecture of a prior art vision chip.

FIG. 1 is a diagram conceptually showing a vision chip, and FIG. 2 is a diagram for explaining the architecture of the prior art vision chip.

As shown in FIG. 1, the vision chip 1, using a plurality of units (pixels) 100 arranged in a matrix array, detects an image (input image) captured through optics (for example, a lens) and processes the image for output.

As shown in FIG. 2, the vision chip 1 is constructed as a single semiconductor chip comprising a plurality of units 100 arranged in a matrix array, a decoder 11, an output circuit 12, and communication means 13. Instruction INST, clock CLK, etc. are input to the decoder 11, and a decoded signal is supplied to each unit 100 via the communication means 13; the signal detected and processed by each unit 100 is supplied via the communication means 13 to the output circuit 12 for output to an external device.

Each unit 100 comprises a photo detector (PD: photo detector circuit, photo detector element) 101 and a processing element (PE) 102. The vision chip 1 (PE 102) shown in FIG. 2 conforms to the architecture $S^3PE$ (Simple and Smart Sensory Processing Element), and achieves a high frame rate exceeding 1,000 frames per second by integrating the sensor (PD 101) and the processor (PE 102) into a single unit and thereby eliminating a communication bottleneck between them. The vision chip having such a high frame rate can easily achieve feedback control using visual information, and is expected to promote the real-time application of image processing in such fields as robot vision. The vision chip architecture of $S^3PE$ will be briefly described below.

In FIG. 2, reference numeral 121 is a local memory, 122 is an I/O port, 123 to 125 are data latches (D latches), and 126 is an ALU (Arithmetic and Logic Unit).

As shown in FIG. 2, the vision chip 1 is constructed by arranging the PE's (processing elements) 102, each corresponding to a pixel, in a matrix array, and one PD (photo detector) 101 is attached to each PE 102. The ALU 126 and the local memory 121 are the major components of the PE 102. The ALU 126 employs a simple configuration comprising a full adder, a carry holding register, and several multiplexers, and executes arithmetic and logic operations using a common circuit. The operations are performed on a bit-by-bit basis, and multi-bit data operations are performed by repeating operations in a bit serial manner.

The local memory 121 comprises a 24-bit random-access memory (RAM) and 8-bit I/O port (8-bit memory-mapped input/output port) 122 assigned to the same address space. These can be accessed randomly on a bit-by-bit basis. The I/O port 122 is connected for communication with four PE's neighboring vertically and horizontally, and coupled to an input of the PD 101 and a zero signal ("0"). By employing this memory-mapped I/O method (122), all operations including not only arithmetic and logic operations but also I/O operations are performed by accessing the local memory 121.

The A/D (analog to digital) conversion of a light intensity signal input from the PD 101 is performed by detecting the discharge of stored charge due to a photo current by means of a threshold circuit (inverter), and by measuring the time elapsing until the value drops below the threshold. Here, by using the PE 102 as a counter, the A/D conversion is accomplished without requiring additional circuitry.

Since the $S^3PE$ uses a SIMD type control method, and the same instruction is executed simultaneously for all the pixels (PE's 102), an algorithm utilizing the locality of an image, that is, such an algorithm that determines pixel value from the pixel itself and its neighboring pixels, can be executed extremely efficiently. For example, processing called early visual processing can be mostly implemented using such an algorithm. Early visual processing is used as image preprocessing preparatory to the extraction/recognition of features in the real-time application of image processing. When this early visual processing algorithm was employed, computation times of the order of microseconds were achieved for all operations. This shows that the vision chip has a computation capability that matches the high frame rate achieved by the vision chip.

When full custom design was done using a 0.35-μm CMOS process based on the above $S^3PE$ architecture, each PE could be accommodated in a compact circuit having about 400 transistors and an area of 105 μm×105 μm, and when a test vision chip with 64×64 pixels integrated thereon was fabricated based on this design, the chip area was 8.7 mm×8.7 mm.

Other than the $S^3PE$ described above, various vision chips have been fabricated using general-purpose PE's. For example, at Linkoping University, Sweden, research was carried out on a vision chip with photo sensors, A/D converters, and a PE array integrated into one chip, and this vision chip was commercially implemented by IVP. This vision chip, called MAPP2200, uses an A/D converter and a general-purpose PE for each CMOS image sensor column in a 256×256 pixel array. The same research group has been conducting research on vision chip near-sensor image processing (NSIP) which performs parallel computation on a pixel-by-pixel basis, and has develop a chip with 32×32 pixels. On the other hand, Bernard et al. of France has designed a vision chip employing a general-purpose PE called a programmable artificial retina, and developed a chip with 65×76 pixels (followed later by a chip with 128×128 pixels).

Further, Gealow et al. developed a pixel-parallel image processor, a pixel-by-pixel SIMD processor which processes one pixel using one PE, though not integrated with a sensor; this processor has 64×64=4096 PE's accommodated on a single chip. A similar approach was taken by Gayles et al. to develop MGAP-2, and 49152 PE's were implemented using 32 chips.

A variety of vision chips have been researched, developed, and proposed in the prior art as described above, but in all of the above prior art vision chip designs, the PE performance has had to be kept to the minimum required for the intended purpose because of the need to make the PE (102) circuit as small as possible. The PE performance here refers mainly to the computation capability and memory capacity. Enhancing the computation capability leads to increasing the algorithm execution speed, and increasing the memory capacity leads to expanding the range of algorithms that can be executed. In particular, the memory capacity is an important consideration in designing the vision chip, and determines the application range of the vision chip.

Generally, in a vision chip (semiconductor integrated circuit device), if it is attempted to expand the range of algorithms, that is, if it is attempted to increase the versatility, the required memory capacity increases, increasing the circuit area of each PE. The increase in the circuit area of each PE directly leads to a reduction in the number of pixels (number of PE's) that can be integrated on one chip. In this way, in a vision chip, there is a tradeoff between the versatility and the number of pixels, and this poses a dilemma when designing a vision chip.

Another problem is that the 2D mesh network structure (communication means ((signal lines) indicated by bidirectional arrow marks in FIG. 2) connecting only to four neighbors vertically and horizontally) employed in many vision chips is unfit for global computations. This structure is very powerful for local computations such as edge detection in which the value of a pixel is determined only from the pixel itself and its neighboring pixels, but in the case of processing that uses information of pixels far away, a communication time corresponding to the distance would be required.

The prior art vision chips and SIMD processors, including the $S^3PE$ described above, have been unable to present effective solutions to the above problems. The MGAP-2 and several other SIMD processors address the former problem by providing a PE coupling function utilizing a condition register but, as the coupling is accomplished in a pseudo manner via the register, as many pipeline stages as there are coupled PE's become necessary. This is not desirable because the efficiency degrades when the number of stages becomes large. Further, this does not present any solution to the latter problem. The GLU employed in NSIP and the moment extraction circuit used in a high-speed object tracking vision chip (which is, for example, described in T. Komuro et al., "High Speed Target Tracking Vision Chip", Int. Conf. On Computer Architecture for Machine Perception (Padova, 2000.9.11)/proceedings, pp. 49-56) partially resolve the latter problem, but these are the type of fixed processing for the entire image, and lack flexibility for applications that require more advanced algorithms.

That is, with the prior art semiconductor integrated circuit devices, it is difficult to satisfactorily achieve such processing as input image feature extraction and image recognition indispensable, for example, to robot vision.

The basic functional configurations of semiconductor integrated circuit devices (vision chips) according to first and second embodiments of the present invention will be described below.

According to the first embodiment of the present invention, there is provided a semiconductor integrated circuit device having a plurality of processing elements accommodated on a single semiconductor chip, comprising: latch means provided at an output of each of the processing elements; and selecting means for selecting an input source from the group consisting of upper, lower, left, and right processing elements and a zero signal.

According to the first embodiment of the present invention, there is also provided a semiconductor integrated circuit device having a plurality of processing elements and communication means for interconnecting the processing elements, wherein a resource in a first processing element is used as a resource in an arbitrary second processing element through the communication means.

According to the second embodiment of the present invention, there is provided a semiconductor integrated circuit device having a plurality of photo detector circuits and a plurality of processing elements, wherein each of the photo detector circuits includes comparing means for comparing an output of a photo detector element with a reference voltage, and A/D conversion is performed by counting the time elapsing until an output of the comparing means drops below the reference voltage.

In the semiconductor integrated circuit device according to the first embodiment of the invention, a plurality of PE's (processing elements) can be coupled together and treated as one large. PE by just making a number of modifications to the existing architecture; as a result, the tradeoff point between the PE performance and the number of pixels (the number of PE's that can be mounted) can be varied and efficient use can be made of resources. Furthermore, according to the semiconductor integrated circuit device of the first embodiment of the invention, global operations such as summing and broadcasting can be performed within the coupled PE's and feedback of feature quantities can be achieved.

More specifically, accumulating operations and multi-bit operations are implemented by adding not only an inter-PE communication function but also an inter-PE electrically coupling function to the bit serial ALU used in the vision chip. This enables global operations, such as calculating a total sum for the entire image, to be accomplished without adding extra circuitry such as adders. Furthermore, by varying the coupling combination, not only can multi-bit operations be performed using a plurality of PE's, but the capabilities of individual PE's can be combined so that they can be used as one powerful processor.

Moreover, by making it possible to select the neighbor communication input source from the group consisting of the zero signal and the upper, lower, left, and right PE's for each PE, a plurality of PE's can be cascaded to form a block. The specification of a block is made via a column bus or a row bus, or is generated from internal data. At this time, in a block constructed by cascading n PE's, n ALU's can be combined and be made to behave as an n-bit ALU, in which case the summing, AND, OR, and XOR operations of n pieces of data and arithmetic operations such as addition and subtraction of n-bit data can be performed at one time. For the memory device also, by combining n PE's each having 24 one-bit memories, it becomes possible to use 24 memories each of an n-bit word. Accordingly, by increasing the size of the block, the computation capability of the block can be increased without wasting the device.

According to the semiconductor integrated circuit device of the second embodiment of the invention, flexible and active image sensing can be achieved by performing A/D conversion of the output of the photo detector element (the pixel value of the photo detector PD) by using software. Performing A/D conversion by using software means that the comparing means (comparator) monitors the charge being gradually released due to the illumination on the photodiode, and that the time elapsing until the voltage drops below the reference voltage (threshold value) is counted by the processing element (PE); here, by varying the counting time interval using a program or by varying the reference voltage, assignment of the analog quantity quantization interval is achieved as desired. Furthermore, by making the reset timing locally variable, it becomes possible to achieve image capture that realizes both wide dynamic range and high frame rate.

The above characteristic configuration of the present invention can be applied not only to vision chips, but also to conventional image sensors or more broadly to semiconductor integrated circuit devices constructed with a plurality of processing elements (computation circuits), and serves to greatly improve the performance.

Examples of the semiconductor integrated circuit device (vision chip) according to the present invention will be described below with reference to the accompanying drawings.

Figure 3:
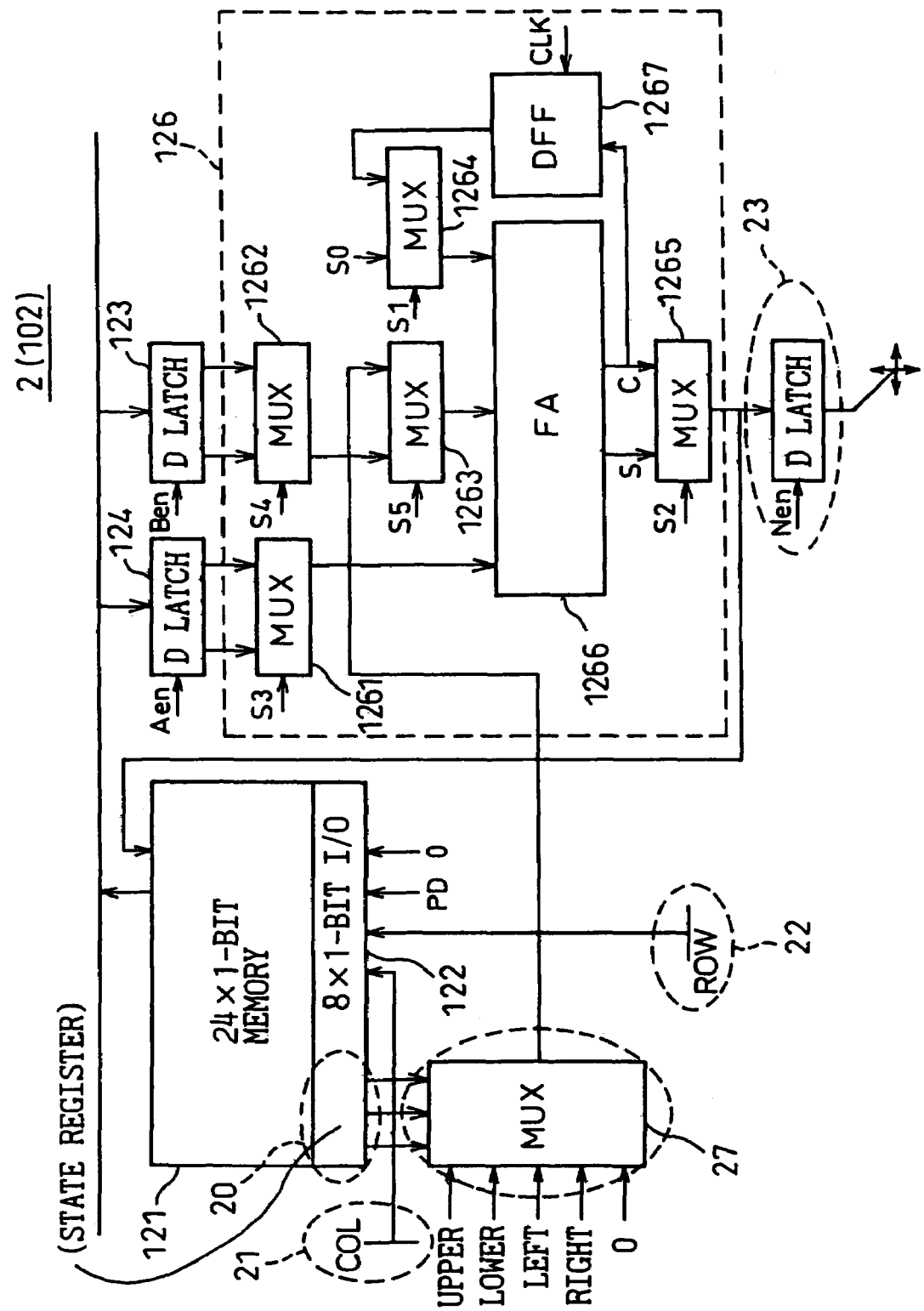
FIG. 3 is a diagram for explaining the architecture of one example of a vision chip according to a first embodiment of the present invention.

FIG. 3 is a diagram for explaining the architecture of one example of the vision chip according to the first embodiment of the present invention. In FIG. 3, reference numeral 2 is a PE (corresponding to the processing element 102 in FIG. 2), 121 is a local memory, 122 is an I/O port, 123 and 124 are data latches (D latches), and 126 is an ALU. Further, reference numeral 20 is a three-bit register (state register), 21 is a column bus (COL), 22 is a row bus (ROW), and 23 is a D latch.

PE's 2 (102), each identical to the one shown in FIG. 3, and each corresponding to a pixel, are arranged in a matrix array, as previously shown in FIG. 2, forming the vision chip 1 with a PD (photo detector 101) attached to each PE 2. The ALU 126 and the local memory 121 are the major components of the PE 2. The ALU 126 comprises multiplexers 1261 to 1265, a full adder (FA) 1266, and a D-type flip-flop (carry holding register) 1267. The respective multiplexers 1261 to 1265 are specified by being controlled by respective instructions (control signals) S0 to S5, and arithmetic and logic operations are performed using the same circuit.

The PE 2 shown in FIG. 3 differs from the S³PE 102 previously shown in FIG. 2 by the inclusion of common buses, i.e., the column bus 21 and the row bus 22, for transferring coordinate dependent values. Further, the output of the state register 20 is supplied to a multiplexer 27, which thereupon selects the neighbor communication input source from the group consisting of the vertically and horizontally neighboring PE's and the zero signal (selects the upper, lower, right, or left PE or the zero signal) and supplies the selected one to the ALU 126 (multiplexer 1263). That is, the neighbor communication input source can be selected from the group consisting of the upper, lower, right, and left PE's and the zero signal by controlling the multiplexer 27 in accordance with the contents of the state register 20 (three-bit register) provided in the memory space. The multiplexer 27 selects the zero signal, for example, when specifying the start point PE by shutting off the output of the multiplexer 27 (the input of the ALU 126). The output of the multiplexer 1265 is supplied to the local memory 121 and, at the same time, is stored in the D latch 23 for output to another PE. That is, the output end for neighbor communication is the latch (D latch 23).

Here, the output signal of the ALU 126 is output via the latch (D latch) 23, not via the flip-flop, because the latch 23 can send out the output signal to another PE (ALU) directly by an input (high level "H") of an enable signal Nen, while the flip-flop would have to wait for an input of a clock CLK (for example, the rise timing of the clock CLK). That is, by connecting, for example, the output of the ALU 126a in the PE 2a to the ALU 126b (full adder 1266b) in the PE 2b via the D latch 23a and via the multiplexer 27b (1263b) in the PE 2b, these can be used as one module (functional block) and real-time processing can be performed.

The computation procedure in the PE 2 as a single unit is the same as that in the S³PE 102 previously shown in FIG. 2; that is, two pieces of data A and B are read out of the local memory 121 and, after performing a computation, the result is written into the local memory 121. In the case of an arithmetic instruction, the carry holding register 1267 is updated after writing the result. If the data A and B are the same as the previous data, the readout operation can be omitted. The kinds of conventional computations that can be executed are the same as those that can be executed in the S³PE 102 of FIG. 2.

In a specific example of the computation procedure, one operand (A) is read from the local memory 121 by momentarily enabling the D latch 124 by an enable signal Aen. Next, the other operand (B) is read from the local memory 121 by momentarily enabling the D latch 123 by an enable signal Ben. When the kind of instruction is specified, the result of the operation is calculated, and the result is stored in the memory 121.

The carry holding register 1267, with its output coupled to an input of the full adder 1266, accomplishes a bit serial operation that performs multi-bit addition/subtraction on a bit-by-bit basis. Here, the carry holding register 1267 updates the carry value by the clock CLK. Further, by setting the control signal S5, applied to the multiplexer 1263, to the high level "H" ("1"), one of the operands on which the operation is performed can be switched to the neighbor input (the output of the multiplexer 27).

The value of the neighbor output that provides the neighbor input source is the result of the operation performed in the ALU 126, and is updated by momentarily enabling the D latch 23 by the enable signal Nen. If, at this time, the control signal S5 is at the high level "H", the output of the full adder 1266 is connected to the input of the full adder in the neighboring PE directly (not via a register), and thus the full adders are connected in cascade. Using this, an accumulating operation or multi-bit operation is accomplished.

In this way, a vision chip capable of handling advanced processing can be achieved with a less wasteful configuration.

Figure 4:
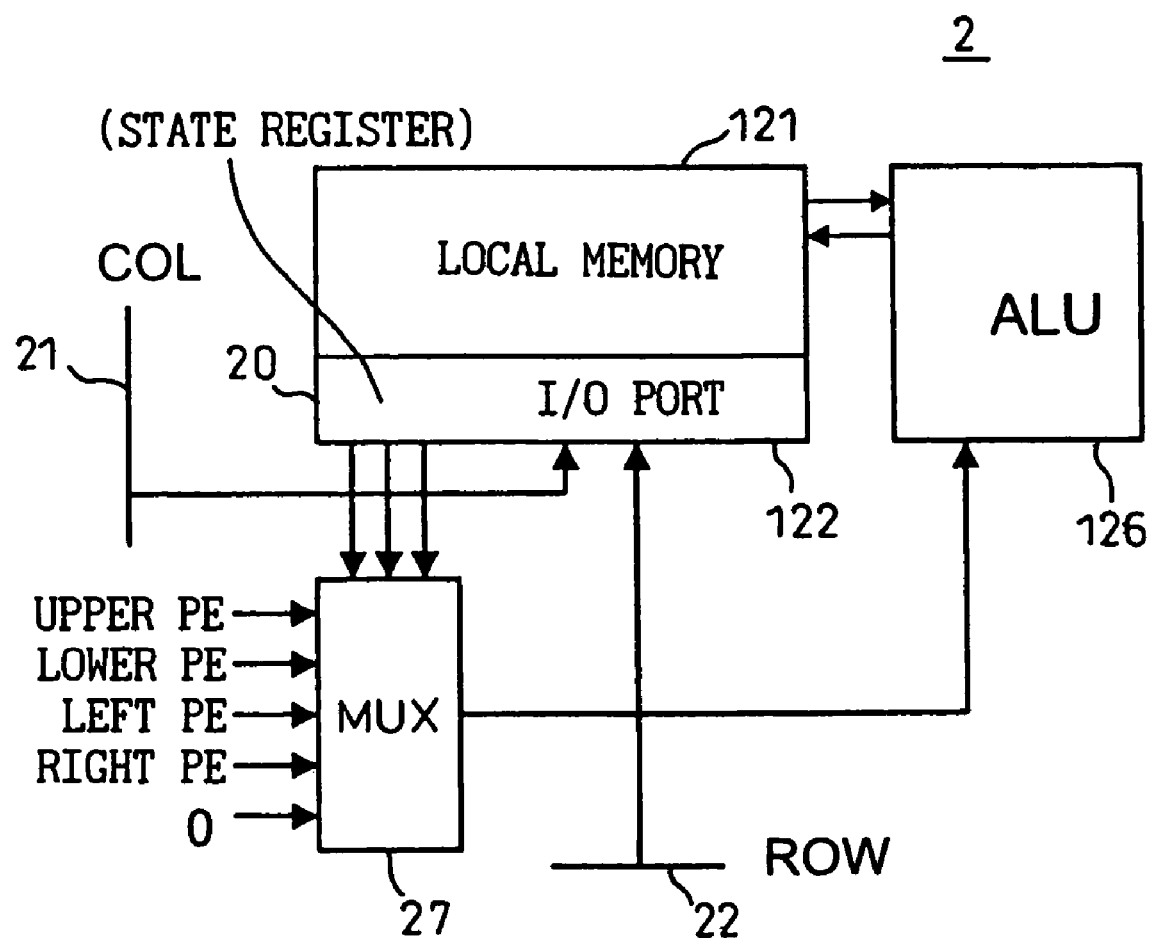
FIG. 4 is a diagram for explaining the configuration for implementing a PE (processing element) block forming process in the architecture of FIG. 3.

FIG. 4 is a diagram for explaining the configuration for implementing a PE (processing element) block forming process in the architecture of FIG. 3, and presents a block diagram schematically showing the essential configuration of FIG. 3 (column bus 21, row bus 22, local memory 121, I/O port 122, state register 20, and multiplexer 27).

The neighbor input source to be coupled to the ALU 126 can be selected for each PE (locally) from the group consisting of the upper PE, the lower PE, the left PE, the right PE, and the zero signal in accordance with the contents of the state register 20 provided in the vision chip (that is, mapped in the local memory 121). The column bus 21 and the row bus 22 are provided as means for transmitting coordinate information to each PE (2).

According to the architecture of one example of the vision chip pursuant to the first embodiment of the present invention, computation capability, memory capacity, etc. can be enhanced by coupling several PE's and treating them as one large PE. Furthermore, by changing the neighbor communication input source locally, various coupling configurations can be formed. More specifically, a variable grain processor, a column parallel processor, etc. can be emulated, as will be described later. Operations that can be performed within the coupled PE's include accumulating operations and multi-bit operations.

Figure 5:
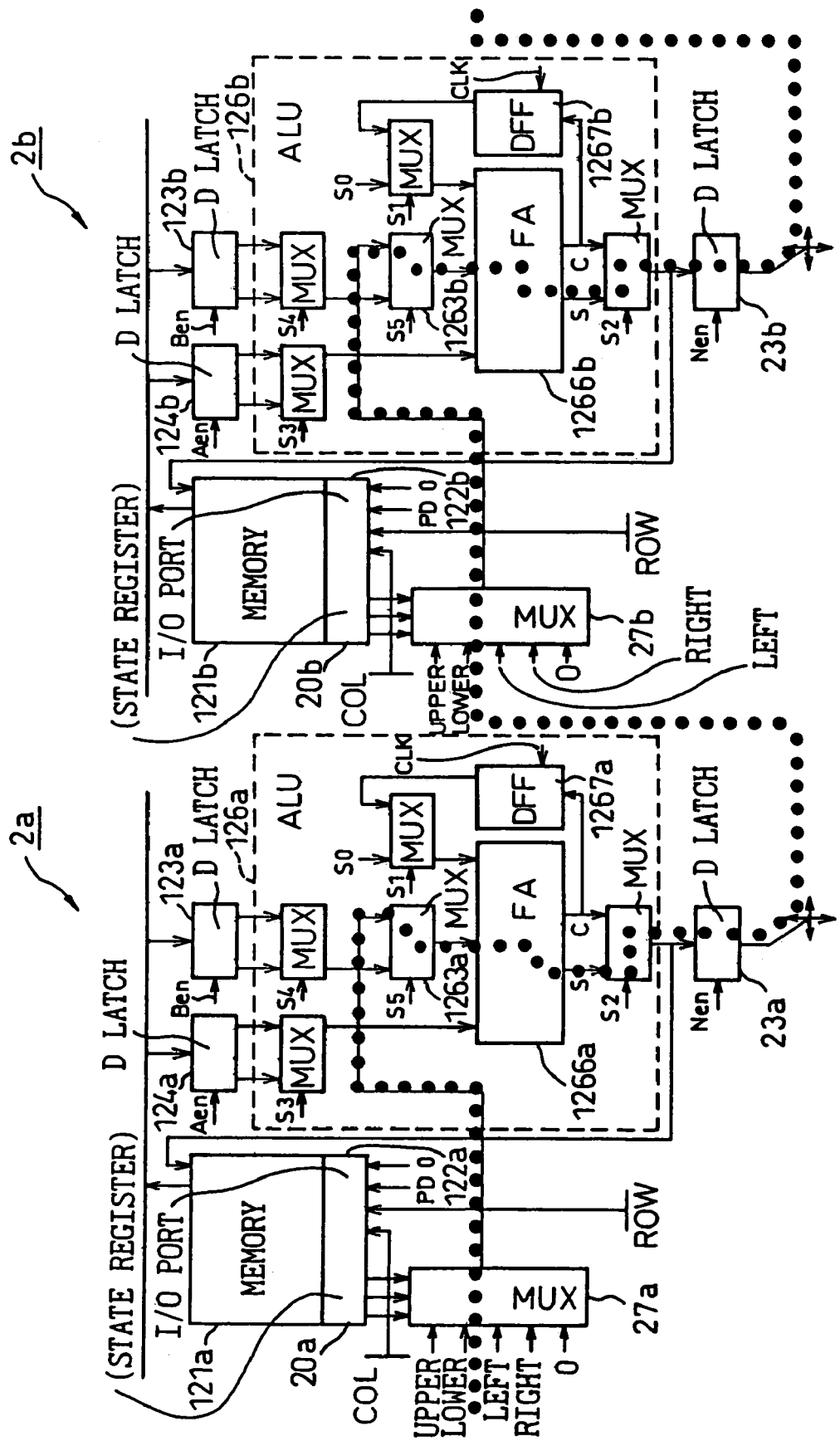
FIG. 5 is a diagram for explaining how PE's are coupled together in one example of the vision chip according to a first embodiment of the present invention.

FIG. 5 is a diagram for explaining PE coupling in one example of the vision chip according to the first embodiment of the present invention, and presents a block diagram showing the coupling of PE's neighboring left and right (in the row direction).

As shown in FIG. 5, coupling between the two processing elements (PE) 2a and 2b neighboring in the row direction, for example, can be accomplished by directly coupling the ALU's 126a and 126b together via the latch 23a in the PE 2a. The thus coupled PE's are used to perform accumulating operations (such as summing or full OR operations) or multi-bit operations.

Figure 6:
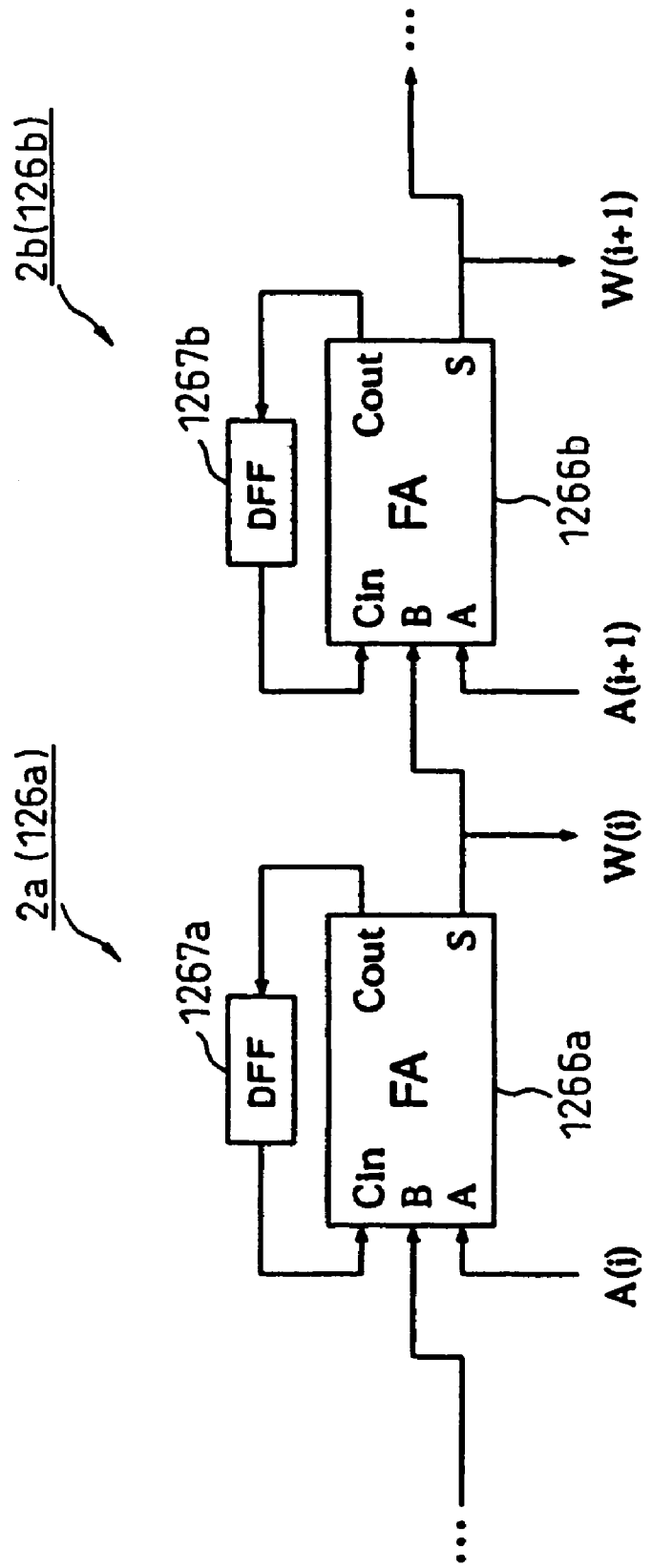
FIG. 6 is a diagram for explaining an accumulating operation in one example of the vision chip according to the first embodiment of the present invention.

FIG. 6 is a diagram for explaining an accumulating operation in one example of the vision chip according to the first embodiment of the present invention, and the arrangement shown in FIG. 6 corresponds to that of FIG. 5.

As shown in FIGS. 5 and 6, first, data is read from the memory (121), stored in the latch (124), and supplied as data A (A(i), A(i+1), . . . ) to the full adder (1266). Next, the control signal S5 to the multiplexer (1263) is set to the high level "H" ("1") to select the output of the multiplexer (27) which is thus supplied as data B to the full adder (1266). At this time, based on the output of the latch (20), the multiplexer (27) selects, for example, the output of the left PE for connection to its output. Further, the output (operation result: W(i), W(i+1), . . . ) of the full adder (1266) is stored in the memory (121). The carry holding register (1267) is updated as necessary.

In this way, the accumulating operation can be implemented, for example, by enabling the latch 23a by setting the enable signal Nen to "1" while holding the control signal S5 to the multiplexer 1263a at "1", and thereby coupling the sum output of the full adder 1266a directly to the input of the full adder 1266b at the next stage. That is, the accumulating operation is accomplished by directly coupling the neighbor output (for example, the output of the ALU (126a) in the left PE (2a)) to the input of the ALU (126b) in the neighboring PE (2b) and thereby forming a multi-stage adder.

In the example of FIG. 6, an accumulating adder is formed by setting the control signals [S0, S1 , S2, S3, S4, and S5], for example, to [1, x, 0, 0, 1, and x] respectively. In this way, the sum of data from the group of PE's can be calculated. By changing the kind of computation, full OR or full AND operations can be performed.

That is, when the kind of computation is selected as logical OR, full OR is performed, and when addition is selected, the sum is calculated. In the case of the sum, the sum is calculated bit serially, starting from the least significant bit. When full OR is used, broadcasting of data within the block can be accomplished.

FIGS. 7A, 7B, 7C, and 7D are diagrams for explaining a summing operation in one example of the vision chip according to the first embodiment of the present invention; here, N=4 and m=2, and the sum of 11+10+01+00 (11+10+ 01+00=0110) is calculated. In this example, since the output of each PE is supplied to its neighboring PE (to the right) via the latch (D latch 23), as previously described, the summing operation can be executed by issuing a single instruction to the PE's organized as one module.

It is also possible to calculate a scalar feature amount such as a moment amount by using, for example, the coordinate value from the column bus 21 and row bus 22 as a mask.

FIGS. 8A and 8B are diagrams for explaining a multi-bit operation in one example of the vision chip according to the first embodiment of the present invention.

As shown in FIG. 8A, first an instruction is executed to store in the carry holding register (1267) a value corresponding to one operand, and then an instruction is issued to couple a carry signal C (C(i), C(i+1), . . . ) to the next stage (in the example FIG. 8A, [1, x, 0, 1, 1, x] are given to the respective control signals S [S0, S1, S2, S3, S4, S5]; by so doing, the multi-bit operation using the plurality of PE's is implemented as shown in FIG. 8B. Here, in the case of an add instruction, a ripple carry adder is formed, as shown in FIGS. 8A and 8B.

More specifically, one of two pieces of data is read from the local memory (121) and stored in the carry holding register (1267) (summing with "1" is executed). The other piece of data is read from the local memory (121) and stored in the latch (124). Then, an instruction is selected (control signals S5="1", S2="1").

Next, the neighbor output latch is enabled (FIG. 8A: The control signal S5 to the multiplexer (1263) is set to "1" to select the output of the multiplexer (27). At this time, based on the output of the latch (20), the multiplexer (27) selects, for example, the output of the left PE for connection to its output.) Further, the neighbor output latch is disabled.

Then, an instruction is selected (control signals S5="1", S2="0": FIG. 8B), and the result of the operation is stored in the memory (121). Here, the term "block" (block formation) is used to refer to the PE group that performs accumulating operations or multi-bit operations such as described above.

In the above multi-bit operation also, the output signal of the ALU (full adder 1267) is connected via the latch (D latch 23), not via the flip-flop, so that the coupled PE's function as one module and real-time processing can thus be accomplished.

Figure 10:
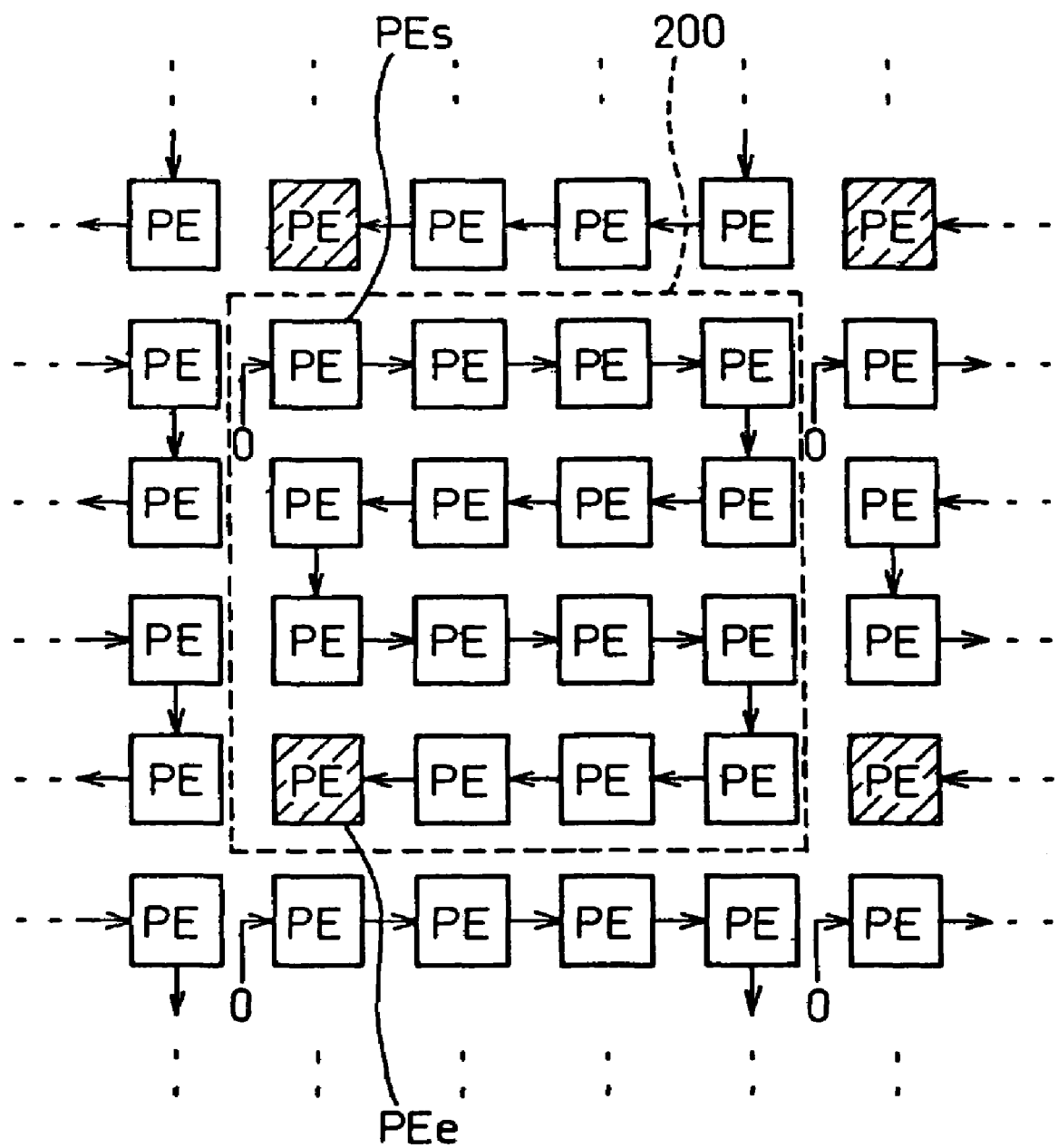
FIG. 10 is a diagram (part 2) for explaining a PE block forming process in one example of the vision chip according to the first embodiment of the present invention.
Figure 11:
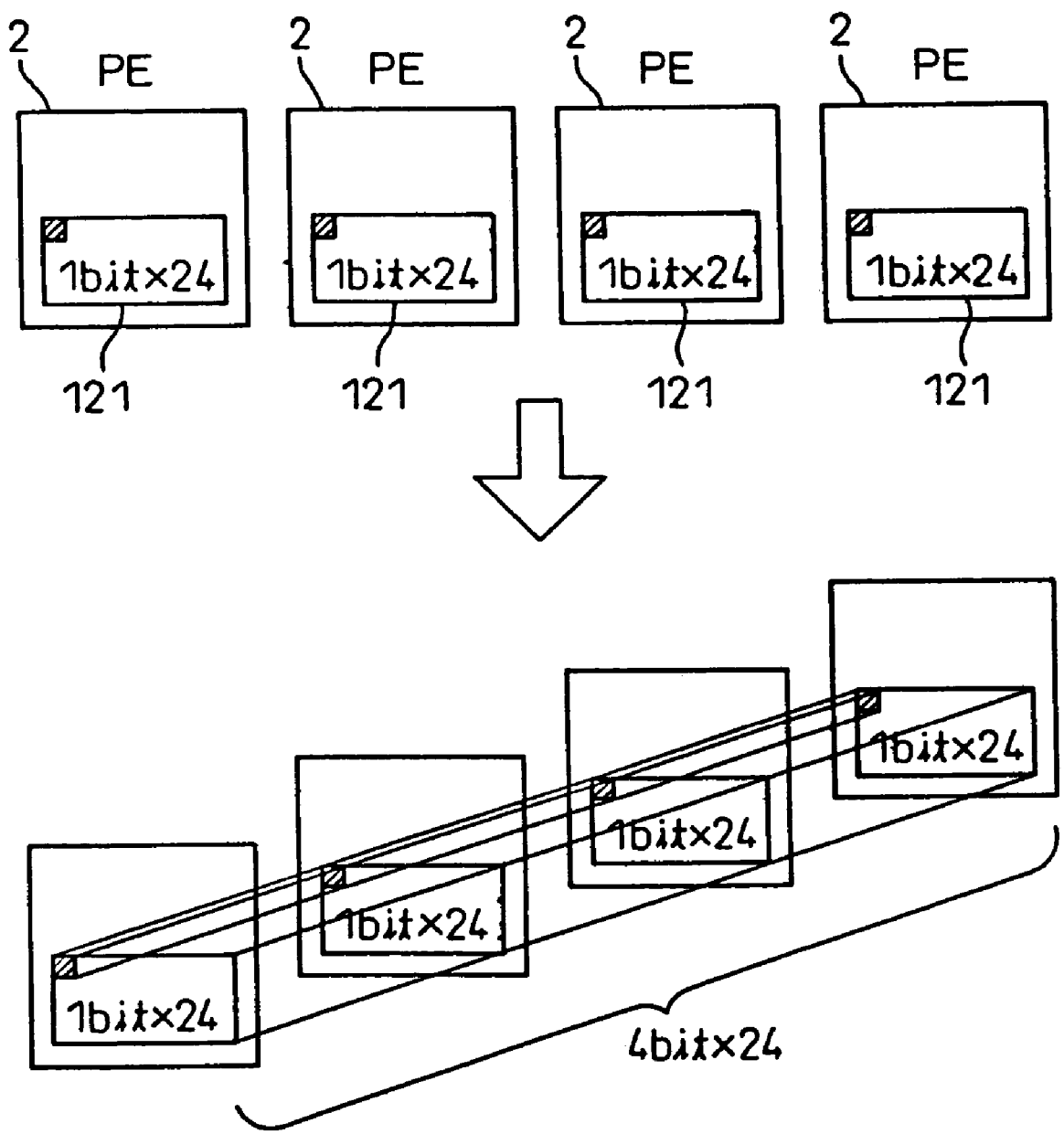
FIG. 11 is a diagram (part 3) for explaining a PE block forming process in one example of the vision chip according to the first embodiment of the present invention.

FIGS. 9 to 11 are diagrams for explaining PE block forming processes in one example of the vision chip according to the first embodiment of the present invention. In FIGS. 9 and 10, reference numeral 200 indicates a block (PE, group), and PEs and PEe designate the start point processing element and the end point processing element, respectively.

FIG. 9 shows an example of a one-dimensional block, and FIG. 10 an example of a two-dimensional block; here, in blocking (grouping) the PE's, a coordinate dependent value is sent to each PE via the column bus 21 and row bus 22 and, based on that value, the value of the state register (20) is locally set, thereby connecting the PE's in a block to form the block, 200.

More specifically, as shown in FIGS. 9 and 10, the zero signal is selected as the neighbor input source for the start point processing element PEs (for example, the multiplexer 27 in the PE shown in FIG. 3 is set so as to select and output the zero signal), and the PE's from the start point PEs to the end point processing element PEe are connected together in a single stroke. Here, the end point processing element PEe is where scalar feature amounts such as the sum are to be stored. The thus formed block 200 is treated as a unit when performing an accumulating operation or a multi-bit operation such as described above.

When the PE's are grouped in a block, for example, in an n×m block, as shown in FIG. 10, nm one-bit ALU's (1266) are connected in cascade and together behave as an nm-bit ALU. Furthermore, by coupling the nm PE's each having the memory (121) formed from 24 one-bit memories, as shown in FIG. 11, it become possible to use 24 memories each of nm-bit word. Accordingly, by increasing the size of the block, the computation capability of the block can be increased without wasting the device.

Furthermore, by dynamically changing the size of the block (200), variable grain image processing becomes possible. Moreover, since broadcasting within the block can be performed as desired, a non-meshed network structure such as one based on pyramidal architecture can be emulated.

Figure 12:
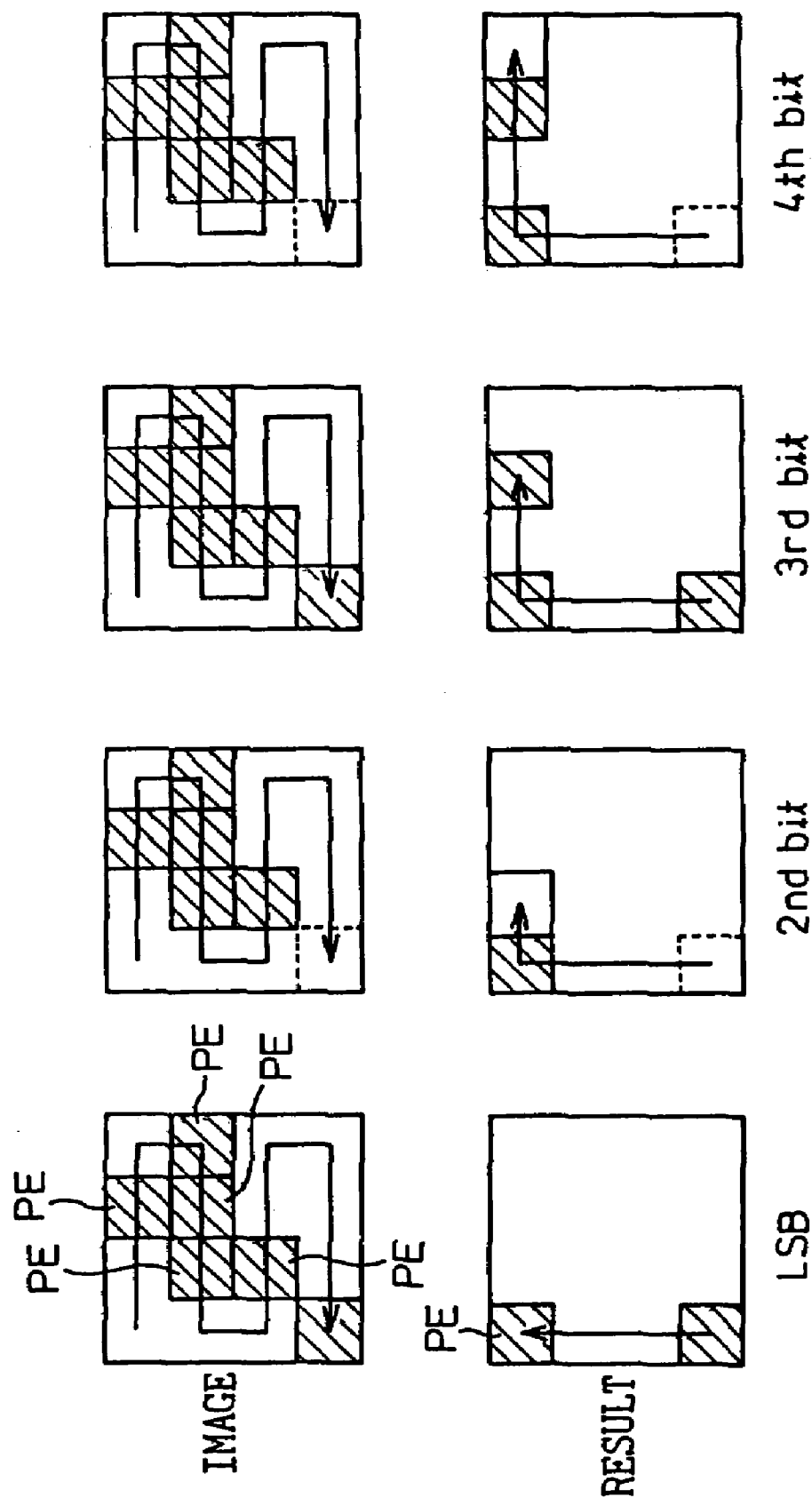
FIG. 12 is a diagram for explaining feature amount feedback processing within a block in one example of the vision chip according to the first embodiment of the present invention.

FIG. 12 is a diagram for explaining feature amount feedback processing within the block in one example of the vision chip according to the first embodiment of the present invention.

Within the above block (200), first a scalar feature amount such as a moment amount is calculated by a summing operation, and the result is broadcast to all the PE's within the block (this is accomplished by full OR), and stored in the coupled memories, thus accomplishing the feedback of the feature amount within the block. Since this series of operations can be performed bit serially, the processing can be carried out without consuming work memory.

As shown in FIG. 12, the plurality of PE's can be used sometimes to express a space (image) and at other times to express a bit string (least significant bit (LSB), second bit, . . . : calculation result), and the memories (resources) can be used freely and without wastage. In this way, by distributing the data held within the block (PE group) over the different PE's each holding a different digit, the amount of memory usage can be reduced compared with the case of each PE alone.

Next, in emulating a column parallel processor, some prior art vision chips and SIMD processors have a column parallel arrangement (for example, MAPP2200) in which only one PE is provided for each column. This type of processor has lower performance than the full parallel type in terms of speed because the column parallel type requires repeated processing for each column, but instead, the performance of each PE can be enhanced. In contrast, when the PE's are connected in a line in the column direction by using the PE coupling function of the vision chip according to the first embodiment of the present invention, these column parallel processors can be emulated without wasting the arithmetic units (ALU's 126) or memories (121).

In a column parallel processor, since any desired pixel can be accessed on a column-by-column basis, the processor provides a powerful tool in a certain kind of coordinate conversion algorithm. In a chip using the conventional 2D mesh network structure, since communication between PE's is limited only to the neighborhood, it is difficult to implement such an algorithm, but by using the broadcast function of the vision chip according to the first embodiment of the present invention, a function equivalent to that of a column parallel processor can be achieved. As a specific example, an implementation of a 90-degree rotation algorithm will be described later.

Figure 13:
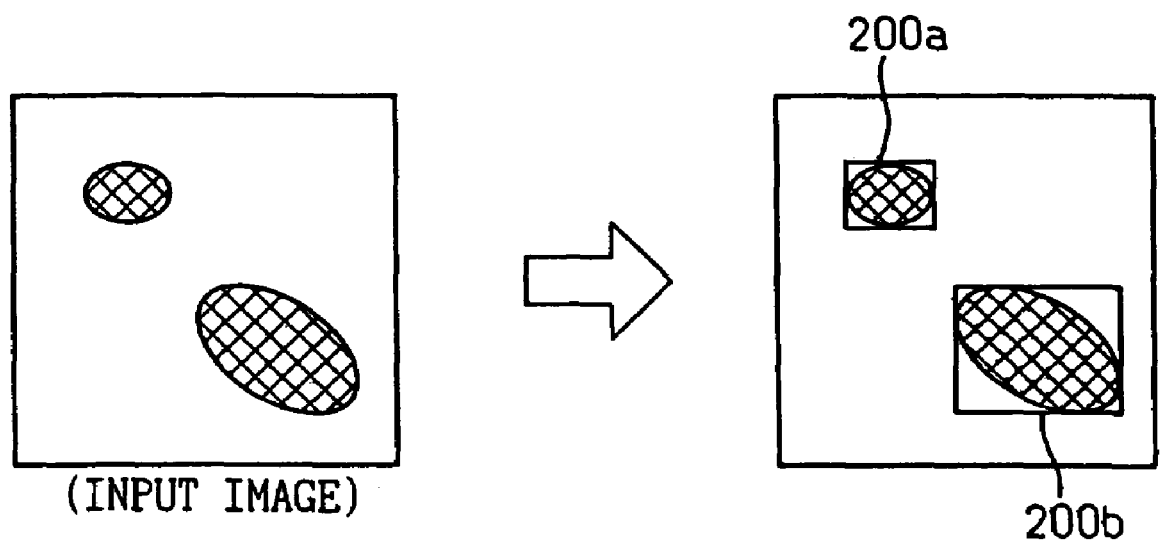
FIG. 13 is a diagram for explaining other processing in one example of the vision chip according to the first embodiment of the present invention.

FIG. 13 is a diagram for explaining other processing, specifically self-generation of blocks, in one example of the vision chip according to the first embodiment of the present invention.

In the above block forming process, as the block is specified externally via the column bus 21 and row bus 22, the block has some order in terms of size and position like a lattice. However, by internally generating blocks 200a and 200b with their sizes and positions based, for example, on input images as shown in FIG. 13 (self-generation of blocks), further flexible blocks can be generated. Here, a plurality of blocks can be generated simultaneously.

Further, by emulating a column parallel machine by connecting PE's in a line in the column direction, the computation capability and memory capacity can be enhanced, and communication between any desired pixels in the column can be performed. This provides a powerful tool in a certain kind of coordinate conversion algorithm.

Next, the result of an implementation of a visual processing algorithm in one example of the vision chip according to the first embodiment of the present invention will be described with reference to FIGS. 14A to 16. The verification of the algorithm was done using a dedicated simulator.

Figures 14A, 14B, 14C:
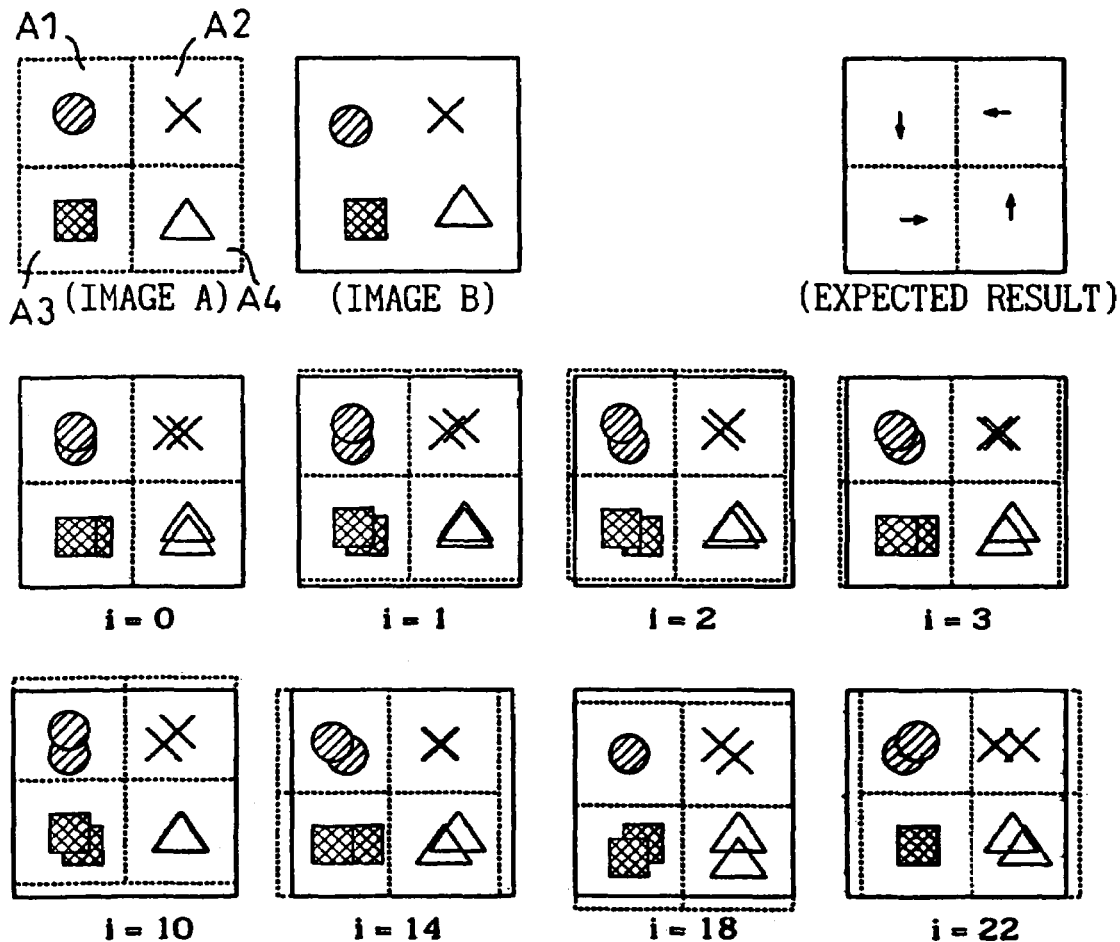
FIGS. 14A, 14B, and 14C are diagrams for explaining parallel block matching where one example of the vision chip according to the first embodiment of the present invention is applied.

FIGS. 14A, 14B, and 14C are diagrams for explaining parallel block matching where one example of the vision chip according to the first embodiment of the present invention is applied; here, the parallel block matching is explained as an example of an algorithm that uses the intra-block feature amount feedback processing described with reference to FIG. 12.

The parallel block matching illustrated here is an algorithm by which, of two images (image A and image B), one image (image A) divided into blocks (A1, A2, A3, and A4) is searched for each block of the other image (image B) to determine in which direction the image is displaced. Possible applications include processing for achieving stereoscopic vison by capturing two images with separate cameras or processing for achieving optical flow by matching the current image input with the image input one frame back.

As shown in FIG. 14A, while moving the one image (image A) in spiraling fashion, the sum of absolute differences (SAD) is taken for each block. If the SAD is larger than the previous maximum value, the maximum value and the index are updated. FIG. 14B shows the program in one example of the parallel block matching and the direction in which the block matching is performed, and FIG. 14C shows the result (index idx) of the parallel block matching. FIG. 14C shows the case where a pattern match was found for block A1 after 18 searches, for block A2 after 14 searches, for block A3 after 22 searches, and for block A4 after 10 searches.

Usually, the operation such as SAD takes time to calculate the sum, and it is difficult to perform the operation repeatedly; however, according to the vision chip of the first embodiment of the invention, as the sum within the block can be calculated at high speed, the SAD operation can be performed without strain. Further, when the input images are 4 bits×2 frames, the block size is 8×8, and the search range is 4×4, for example, the memory amount used is 8 bits for the input images, 4 bits for storing the absolute difference, 10 bits for storing the result of the SAD, 10 bits for storing the maximum value, and 4 bits for storing the index, that is, a total of 36 bits plus a few bits for work area, and thus exceeds the capacity (for example, 24 bits) of the local memory provided in each PE.

However, according to the vision chip of the first embodiment of the invention, since the result of the SAD, the maximum value, the index, etc. can be stored by being distributed over the memories in the plurality of PE's within the block, the memory area will not be overloaded.

In a specific example, when the input image was 4 bits, the block size was 8×8 pixels, and the search range was n pixels, the number of computations needed was (224n−12) for conventional computations, (22n−2) for intra-block accumulating computations, and (66n−6) for coordinate specifying computations, and the amount of memory used in each PE was 19 bits.

FIG. 15 is a diagram for explaining 90-degree rotation processing where one example of the vision chip according to the first embodiment of the present invention is applied.

For example, consider the case where an erect image "A" is rotated through 90 degrees in the counterclockwise direction. Here, coordinate conversion algorithms such as rotation, enlargement, and Fourier transform algorithms are not suited for execution in a conventional 2D mesh coupled SIMD processor, because there is no locality of processing. However, if the parallelism is reduced from two dimensions to one dimension, and iterative operations are performed, the operations may become possible. In this example, the vision chip according to the first embodiment of the present invention was regarded as a column parallel processor, and a 90-degree rotation algorithm was implemented.

As shown in FIG. 15, the procedure of the algorithm is such that each column is converted into a row across the diagonal. Movement of data in the same column or row is performed using broadcast by an accumulating operation.

When this algorithm was employed, the number of computations necessary when the input image was 1 bit and the number of pixels was N×N ($2^n$=N), was (4N+2n+2) for conventional computations, 4N for column (row) accumulating computations, and (6N+2n) for coordinate specifying computations, and the amount of memory used in each PE was 4 bits.

FIG. 16 is a diagram for explaining simultaneous tracking of a plurality of objects where one example of the vision chip according to the first embodiment of the present invention is applied.

One possible way to track a plurality of objects simultaneously is to perform processing for tracking on each individual object in sequence. However, if the number of targets is large, the processing may not be done within the required frame rate. In view of this, the tracking processing in FIG. 16 considers tracking a plurality of objects simultaneously by using the blocking function of the vision chip according to the first embodiment of the present invention. In this case, blocks must be formed that match the shapes and positions of the targets in the input image, and this is where the self-generation of blocks described above comes into play.

First, as shown in FIG. 16, initial blocks are arranged in the initial positions (assumed to be known) of the objects, based on which blocks enclosing the respective targets are self generated. Next, the scalar feature amount within each block is calculated and output. Based on the feature amount, the position information of the corresponding target is calculated, and the calculated position is taken as the position of the initial block in the next frame.

Here, the initial block arrangement, the output of the feature amount, and the calculation of the position information need to be done for each target, but since the block self-generation and the feature amount calculation can be done simultaneously for the plurality of objects, the entire tracking processing time can be reduced.

When the above algorithm is employed, if the input image is 1 bit (binary), the number of targets is m, the maximum target size is $n_{max} \times n_{max}$, and the number of pixels is N×N, then the initial block arrangement and the block self-generation take ($51n_{max}+12m+4$) conventional computations, $4n_{max}$ intra-block column-wise (row-wise) accumulating computations, and ($5m+16n_{max}$) coordinate specifying computations. For the calculation and output of the feature amount, when a moment is used, it takes (66 $\log_2 n_{max}+40 \log_2 N$) conventional computations, (12 $\log_2 n_{max}+8 \log_2 N$) intra-block accumulating computations, (6 m $\log_2 n_{max}+4$ m $\log_2 N$) column-wise (row-wise) accumulating computations, and (2 m+2 $\log_2 N$) coordinate specifying computations. The total amount of memory used is 7.

Estimated execution times and estimated memory amounts used for the above-described algorithms are shown by way of example in Table 1 below. Here, the number of pixels is 256×256, the matching search range is 9×9 pixels, the tracking target maximum size is 32×32, the number of targets to be tracked is 10, the execution speed of conventional computation is 40 ns, the execution speed of N-stage accumulating computation is (20+1.0N) ns, and the execution speed of coordinate specifying computation is 20 ns.

TABLE 1

| Algorithm | Execution time | Memory used |
| --- | --- | --- |
| Parallel block matching | 982 μs | 19 |
| 90-degree rotation | 355 μs | 4 |
| Multiple object tracking | 415 μs | 7 |
| Required specification | <1 ms | <24 |

A test chip was designed based on the architecture according to the first embodiment of the invention described above. Since there was hardly any addition of circuitry to the previous design, functionality could be increased without increasing the amount of circuitry. Furthermore, higher integration was achieved by improving the circuit design and layout. Specifically, global wiring of the control signals and non-dual design of the SRAM provide a great effect. While the previous PD circuit has employed a method in which the time elapsing until the inverter inverts is counted, the present invention employs a method in which the voltage is compared with the reference voltage Vref by using a comparator, and this offers the advantage that not only can the current consumption be reduced significantly, but the threshold voltage for A/D conversion can be varied.

More specifically, 64×64 pixels (corresponding to the units 100 in FIG. 1) can be accommodated on a chip fabricated, for example, using a 0.35-μm CMOS DLP/TLM process, and having an area size of 5.4 mm×5.4 mm. Here, the area of each PE is, for example, 67.4 μm×67.4 μm, and 256×256 pixels can be accommodated on a chip about 1.8 cm square, the number of pixels thus being able to be increased to the number considered to be standard for an image processing device.

In this way, the vision chip additionally equipped with the PE coupling function and global processing function according to the first embodiment of the present invention is effective in the real-time application of image processing because block matching for stereo vision and optical flow, for example, can be accomplished within 1 ms, and thus the range of applications that can be executed on the vision chip can be expanded.

As described above, according to the present invention, as the circuits such as FA and DFF contained in the ALU can be used not only for conventional computations but also for accumulating and multi-bit computations, a variety of commutations can be achieved while retaining the small amount of circuitry. As a result, a vision chip capable of performing global computations can be achieved with almost the same amount of circuitry as the previous one.

Furthermore, as the neighbor communication input source can be selected for each PE, a plurality of PE's can be grouped into a block to make up for the limited performance of each PE alone. As a result, there is no need to design the PE so as to meet the maximum specification of every expected application, and this serves to not only reduce the amount of hardware significantly, but also greatly increase the range of possible applications.

As the second embodiment of the present invention, a semiconductor integrated circuit device that A/D converts the output of the photo detector circuit PD (photo detector element: photodiode) by using software will be described in detail below.

In the prior art, as described with reference to FIG. 2, in the $S^3$PE, the A/D conversion of the light intensity signal from the photo detector (PD) 101 is performed by detecting the discharge of stored charge due to a photo current by using a threshold circuit (inverter), and by measuring the time elapsing until the value drops below the threshold; here, by using the PE 102 as a counter, the A/D conversion is accomplished without requiring additional circuitry.

FIG. 17 is a diagram for explaining a configuration for performing A/D conversion of the output of the photodiode (photo detector circuit PD) in one example of the prior art vision chip. In FIG. 17, reference numeral 301 indicates the photo detector (PD 101), and 302 the processing element (PE 102).

The PD 301 comprises a photo detector element (photodiode) 311 and a threshold circuit (inverter) 312, and the threshold circuit 312 detects the discharge of stored charge due to the photo current produced in the photodiode 311. The PE 302 A/D converts the light intensity signal supplied from the PD 301 by using software, that is, the A/D conversion is performed by measuring the time elapsing until the value detected by the threshold circuit 312 drops below the threshold value. That is, by using the PE 102 as a counter, the A/D conversion is accomplished without requiring additional circuitry.

Figure 18:
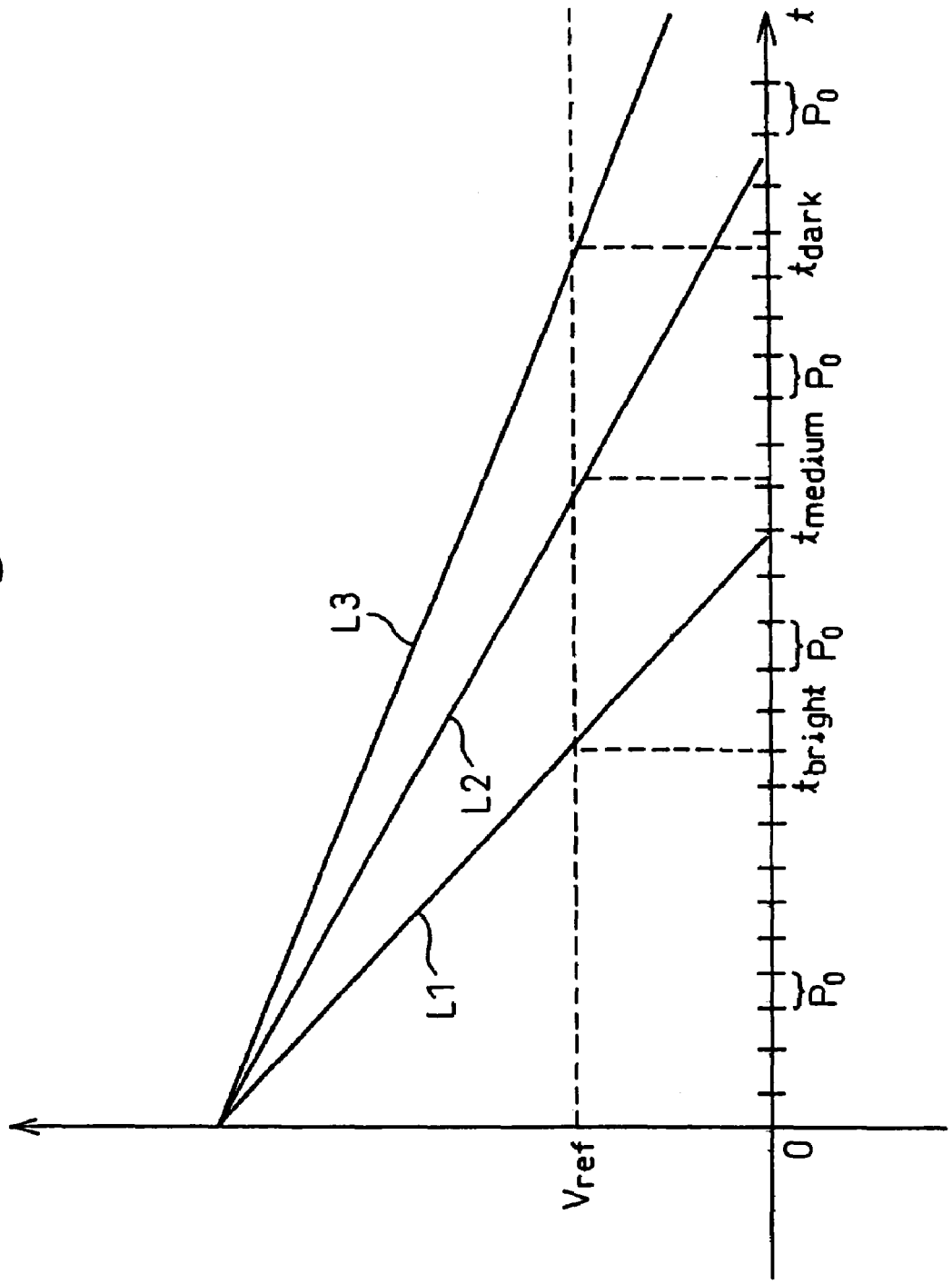
FIG. 18 is a diagram for explaining the problem associated with the A/D conversion of FIG. 17.

FIG. 18 is a diagram for explaining the problem associated with the A/D conversion of FIG. 17. In FIG. 18, reference character L1 shows the time versus output voltage relationship when the light intensity falling on (illuminating) the photo detector element (photodiode) 311 is large (bright), L2 shows the relationship when the light intensity falling on the photo detector element 311 is medium, and L3 shows the relationship when the light intensity falling on the photo detector element 311 is small (dark).

As shown, when the light intensity falling on the photo detector element 311 is large, the voltage drop due to the photo current is large (L1), while when the light intensity falling on the photo detector element 311 is small, the voltage drop due to the photo current is small (L3). Here, in the A/D conversion of FIG. 17, as an inverter is used as the threshold circuit 312, the threshold voltage (reference voltage Vref) is fixed, and the interval at which the PE 302 detects a change in the output of the threshold circuit 312 (the counter's time measuring operation) is also fixed ($P_0$).

In this way, for the A/D conversion of the photo detector circuit PD (photodiode output) in one example of the prior art vision chip shown in FIG. 17, the threshold circuit (inverter) 312 with fixed threshold value is used, and the change in the output of the threshold circuit 312 is detected at the predetermined time interval $P_0$. As a result, it has been difficult to perform proper control with respect to light intensity and noise, and it has not been possible to increase detection accuracy where necessary.

Figure 19:
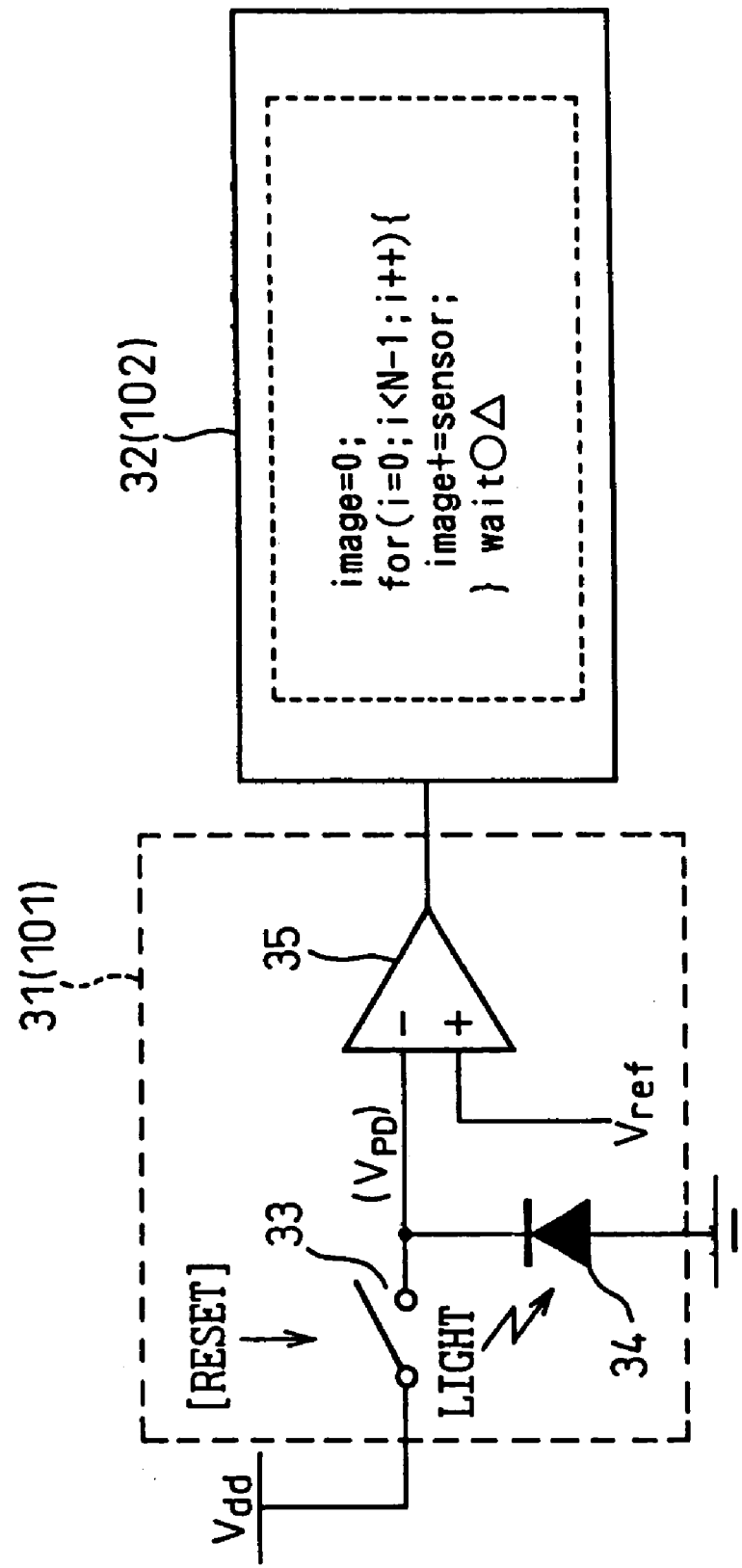
FIG. 19 is a diagram for explaining a configuration for performing A/D conversion of a photodiode output in one example of the vision chip according to a second embodiment of the present invention.
Figure 20:
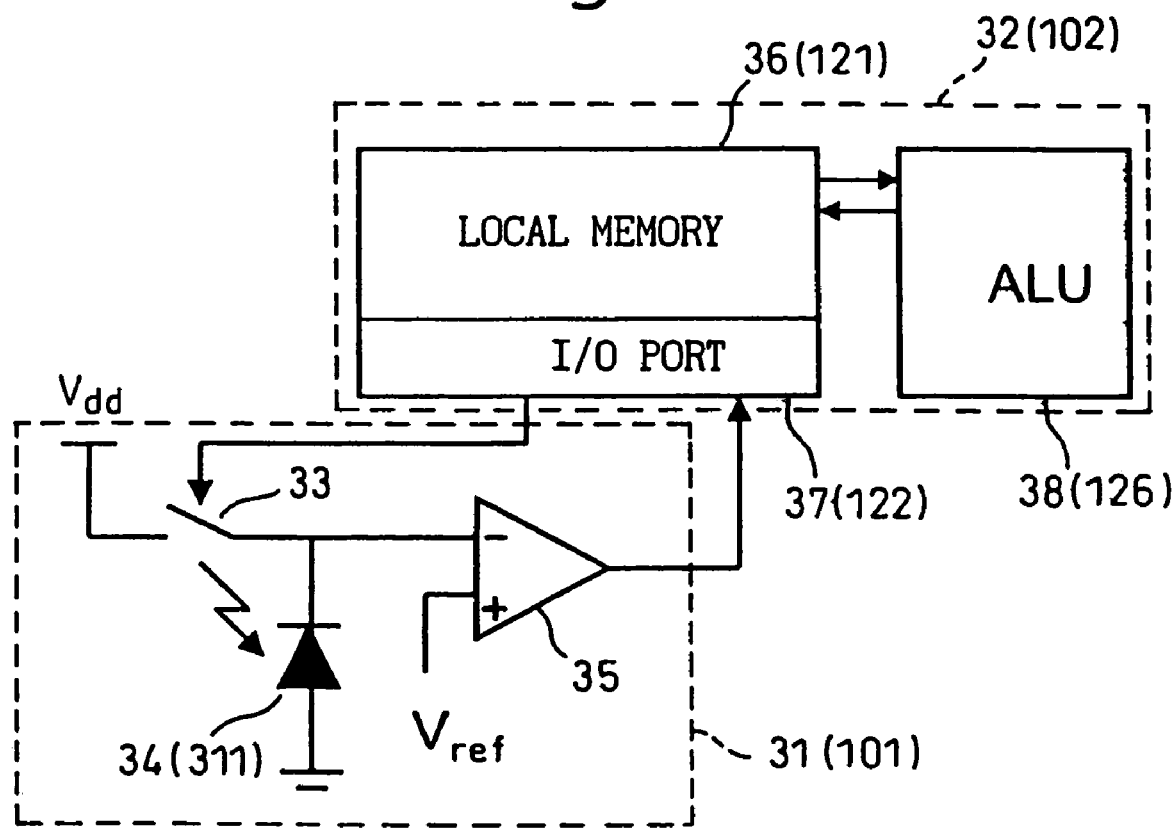
FIG. 20 is a diagram showing one example of the configuration of FIG. 19.

FIG. 19 is a diagram for explaining a configuration for performing A/D conversion of the output of the photodiode (photo detector circuit PD) in one example of the vision chip according to the second embodiment of the present invention, and FIG. 20 is a diagram showing one example of the configuration of FIG. 19. In FIGS. 19 and 20, reference numeral 31 is a photo detector (PD 101), 33 is a reset circuit, 34 is a photo detector element (photodiode 311), and 35 is a comparator (comparing means). Further, reference numeral 32 is a processing element (PE 102), 36 is a local memory (121), 37 is an I/O port (122), and 38 is an ALU (126). The output (cathode) of the photodiode 34 is connected to the negative input of the comparator 35 whose positive input is coupled to a reference voltage Vref.

As shown in FIGS. 19 and 20, the charge stored in the parasitic capacitor of the photodiode 34 is accumulated or released when a photo current of the amount proportional to the intensity of illumination flows (in the example of FIGS. 19 and 20, the charge is released) and, with this, the input voltage to the comparator 35 changes and an inversion occurs in the output when the voltage becomes smaller than the predetermined reference voltage (threshold) Vref. This output of the comparator 35 is detected via the I/O port 37 (in FIG. 20, mapped in the local memory 36) and is counted using the ALU 38 and memory 36 in the PE 32.

Further, as shown in FIG. 20, the signal for resetting the charge of the photodiode 34 is sent from the I/O port 37 to the reset circuit 33, thereby controlling the reset timing for each PE (locally).

The above-described A/D conversion (A/D conversion with variable quantization interval) according to the present invention employs a method that detects the voltage drop due to the photo current by means of the comparator 35, and counts the time elapsing until the voltage drops below the reference voltage Vref. In this case, the output is the reciprocal of the light intensity, which is inconvenient for image processing; therefore, the quantization interval is adjusted by changing the count timing with time so that the output is proportional or logarithmically proportional to the light intensity.

At this time, as it is required that the vision chip be controlled with high time resolution, a controller that can guarantee real-time processing at the granularity of the instruction cycle by enhancing the time resolution of instruction supply by pipelining, and by completely eliminating dynamic stoppage of the pipeline, is used as a device (system) that supplies instructions to the vision chip. Furthermore, by varying the reference voltage Vref during the counting, even more flexible sensing can be achieved. For example, by gradually raising the reference voltage Vref while performing the counting, a sensing operation that places emphasis on sensitivity where it is dark and on accuracy where it is bright can be achieved. Furthermore, by actively using the mechanism of the variable quantization interval A/D conversion, and by updating the control of the assignment of the interval at the current time by using past A/D conversion results, A/D conversion adapted to environmental changes can be achieved. The details of this will be described later.

In the circuit shown in FIG. 20, resetting of the PD 31 (photo detector element 34) can be done on a pixel-by-pixel basis and, using this function, the reset signal is applied selectively to the pixel (PD) in which the voltage has dropped below the reference voltage Vref. This enables the image to be captured at a high frame rate where it is bright and at a low frame rate where it is dark, thus achieving image capture that realizes both wide dynamic range and high frame rate.

Furthermore, since A/D conversion of the PD 31 (photo detector element 34) is performed using the existing ALU 38 and memory 36 in the PE, the A/D conversion can be accomplished without requiring additional circuitry. This method offers the further advantage that since the control timing of the photo detector element (photodiode) 34 can be varied by software, flexible sensing can be achieved which has not been possible with the prior art image sensor.

Figure 21:
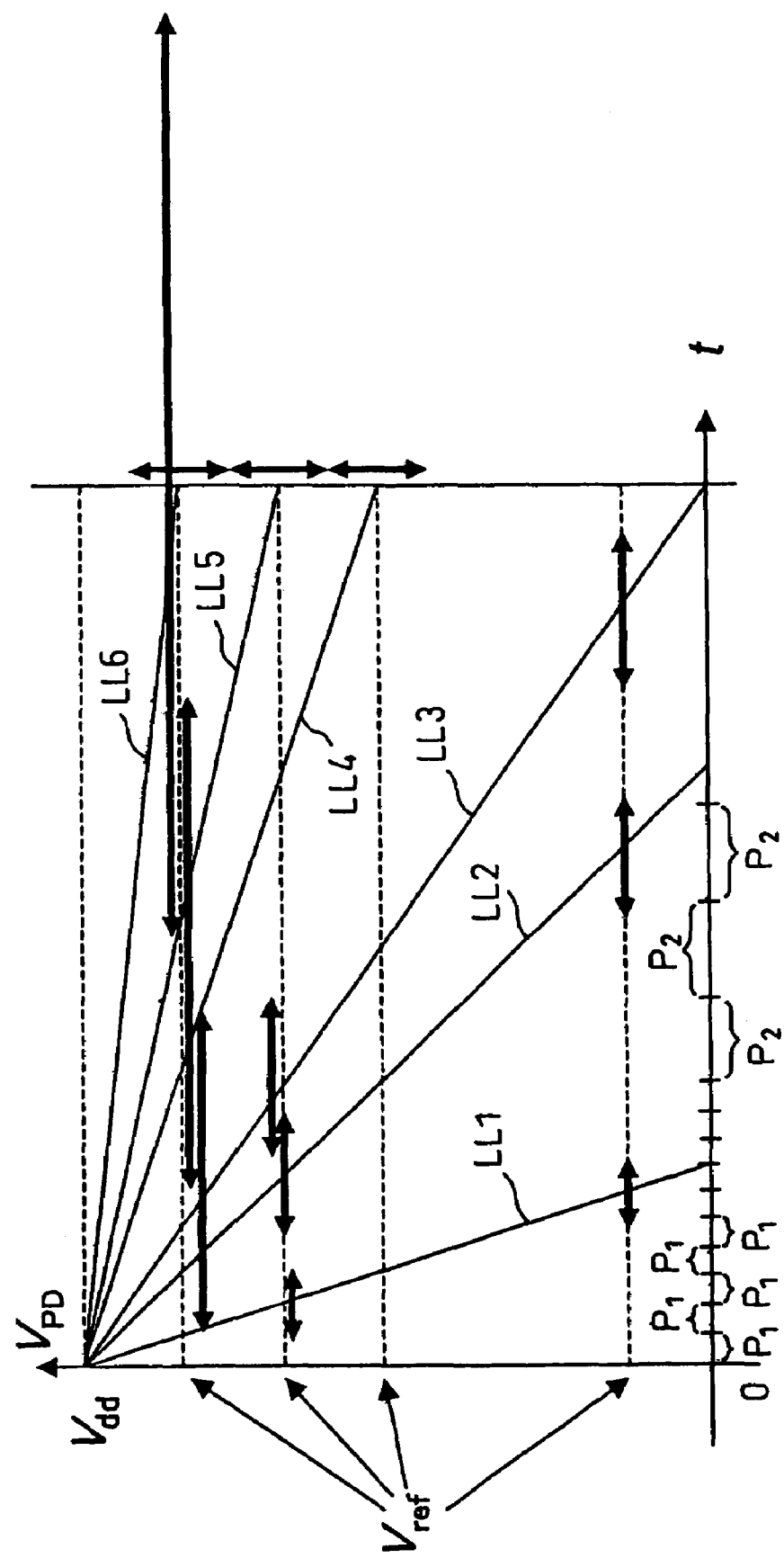
FIG. 21 is a diagram for explaining the operation of the A/D conversion of FIGS. 19 and 20.

FIG. 21 is a diagram for explaining the operation of the A/D conversion of FIGS. 19 and 20. In FIG. 21, reference characters LL1 to LL6 each show the time versus output voltage relationship, LL1 representing the relationship when the intensity of light falling on the photo detector element (photodiode) 34 is the highest (brightest) and LL6 when the intensity of light is the lowest (darkest).

As shown in FIG. 21, the A/D conversion of FIG. 20 is controlled by setting the reference voltage Vref to different voltage levels, and also by switching the detection interval of the output of the threshold circuit (comparator) 35 in the processing element (PE) 32 (the counter's time measuring operation) between different time intervals (for example, $P_1$ and $P_2$). As shown in FIG. 21, even if the noise level is the same, the influence of noise increases as the light intensity decreases (for example, the influence is larger for LL4 and LL5 than for LL1), and the detection accuracy increases as the reference voltage Vref decreases.

Here, when the intensity of light falling on the photodiode 34 is large, it is preferable to lower the reference voltage Vref of the comparator 35 to increase resistance to noise and enhance the detection accuracy. Conversely, when the intensity of light falling on the photodiode 34 is small, the sensitivity must be increased by raising the reference voltage Vref of the comparator 35. As for the detection interval of the output of the comparator 35 (the counter's time measuring operation), when it is expected, for example, that the intensity of light falling on the photodiode 34 is large (for example, LL1), the detection time interval may be set first to a small value ($P_1$) and later to a larger value ($P_2$) so that the detection accuracy can be increased by detecting the change in the output of the comparator 35 at short time intervals.

In this way, the semiconductor integrated circuit device according to the second embodiment of the present invention can perform proper control with respect to light intensity and noise to match the system (apparatus) to which the vision chip is applied, and can thus perform control so as to increase the detection accuracy where necessary.

Figure 22:
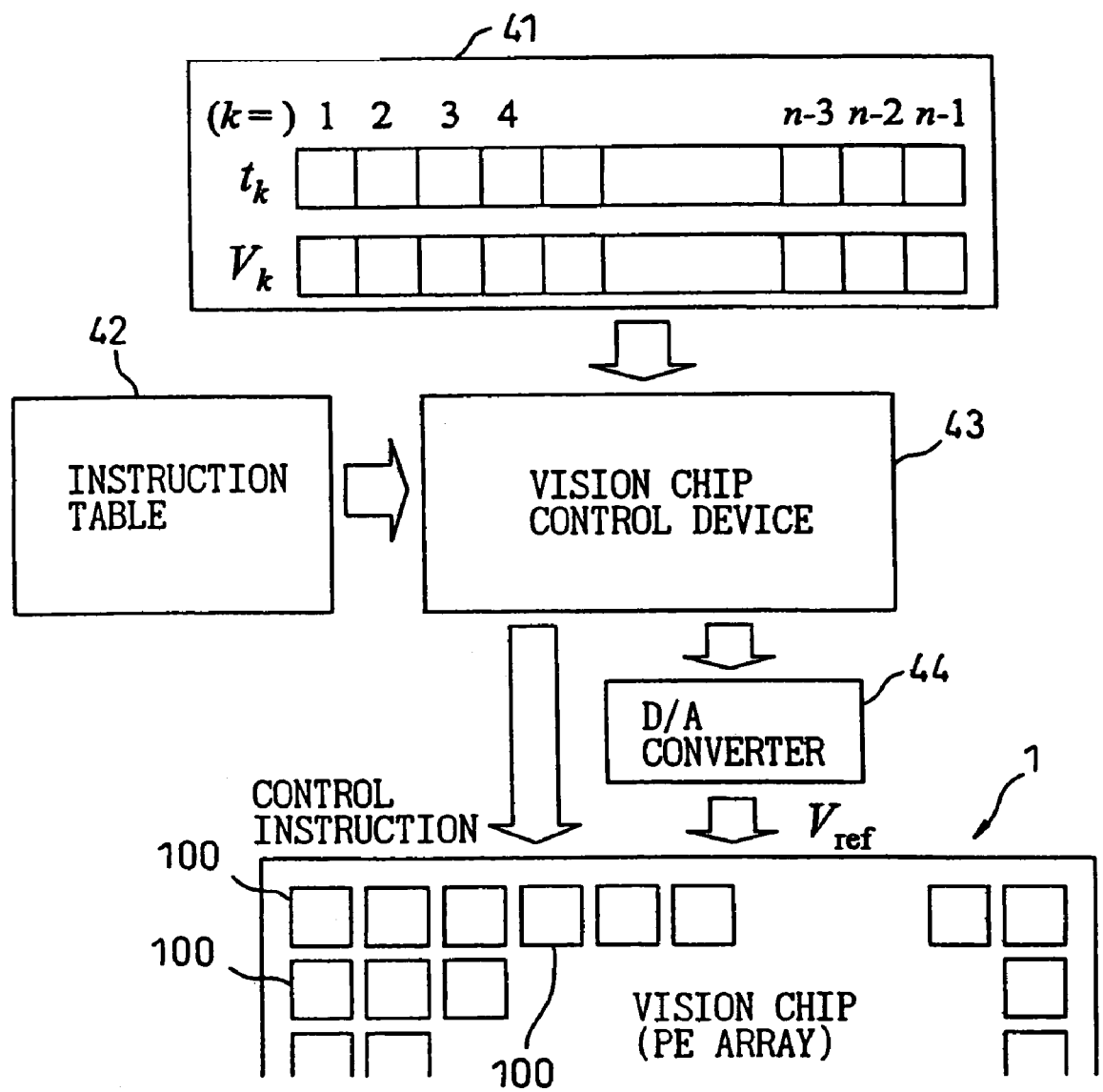
FIG. 22 is a diagram showing a configuration example of a system to which the vision chip according to the second embodiment of the present invention is applied.

FIG. 22 is a diagram showing a configuration example of a system to which the vision chip according to the second embodiment of the present invention is applied. In FIG. 22, reference numeral 1 is the vision chip (semiconductor integrated circuit device), 100 is a unit (pixel), 41 is a PD readout time/supply voltage table (a table containing the timing (time interval) at which to detect the output of the photo detector circuit PD and also containing the reference voltage Vref to be applied to the comparator), 42 is an instruction table, 43 is a vision chip control device, and 44 is a D/A converter. First, the operation of the variable quantization interval A/D conversion will be described.

As shown in FIG. 22, in the system to which the semiconductor integrated circuit device (vision chip) according to the second embodiment of the present invention is applied, the vision chip control device 43 has the function of supplying control instructions and the reference voltage Vref in accordance with the instruction table 42 and the PD readout time/supply voltage table 41, respectively.

An n-step variable quantization interval A/D conversion can be performed in the following procedure.

1) A control instruction is supplied for initializing the memory area storing the conversion result of each pixel 100 (the local memory 36 in each PE) to zero.

2) A control instruction is supplied for resetting all the pixels (by turning the reset circuit 33 on and then off) (time is set to 0).

3) Voltage V1 is supplied as the reference voltage Vref.

4) The following process is repeated for k=1, 2, . . . , n−1.
  i) After waiting till time $t_k$, a control instruction is supplied for reading out the output of the photo detector 31 (photodiode 34) in each pixel.
  ii) Voltage $V_k+1$ is supplied as the reference voltage Vref.
  iii) For each pixel 100, a control instruction is supplied for adding one-bit value, read out in the above step (i), to the memory area storing the conversion result.

5) When the above procedure is completed, the A/D conversion result has been stored in the conversion result storing memory area of each pixel.

Next, the method of determining $\{t_k\}$ and $\{V_k\}$ will be described. Here, $\{t_k\}$ corresponds to the time (count timing) at which the processing element (PE) detects the output of the photo detector PD, while $\{V_k\}$ corresponds to the reference voltage (Vref) supplied to the comparator (35).

According to the semiconductor integrated circuit device pursuant to the second embodiment of the present invention, various quantization intervals can be realized by varying the $\{t_k\}$ and $\{V_k\}$ stored in the table. As a specific example of the method of determining $\{t_k\}$ and $\{V_k\}$, an algorithm will be described which, from $\{i_k\}$ (photo current amount quantization interval (sequence)) given as a specification, calculates $\{t_k\}$ and $\{V_k\}$ that achieve it.

FIGS. 23 to 25D are diagrams for explaining the A/D conversion processing of the photodiode output in the system of FIG. 22.

Figure 23:
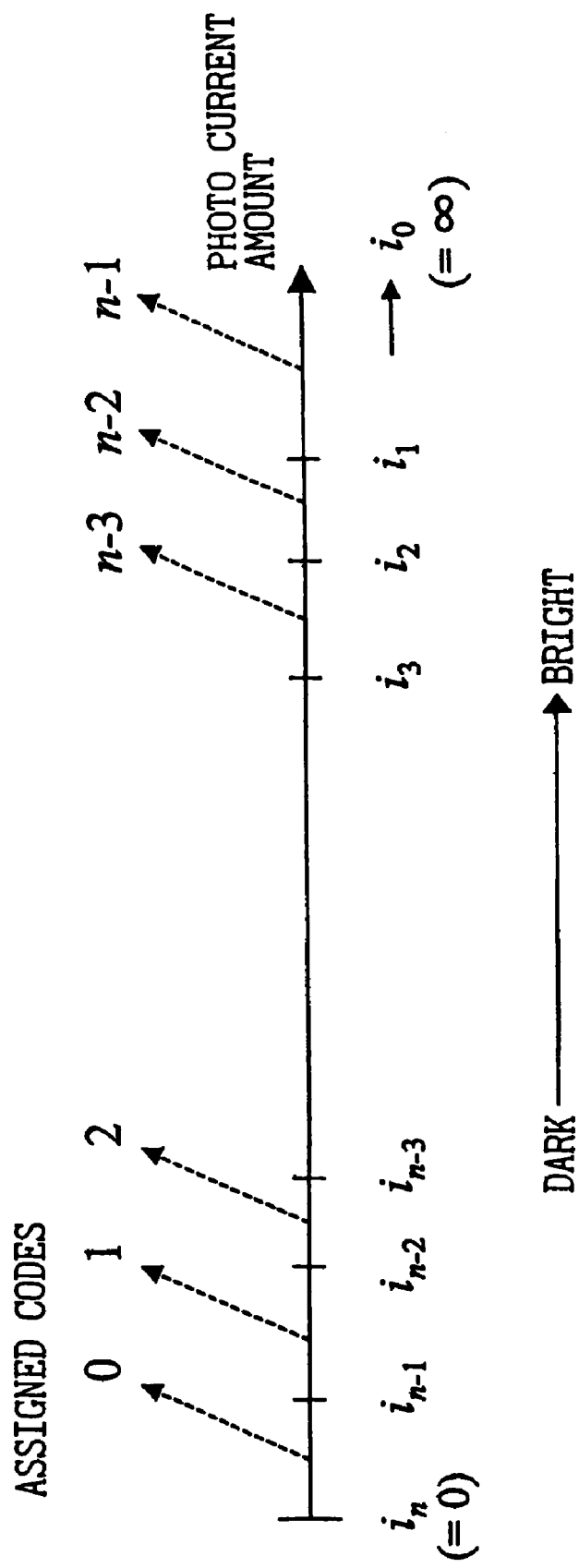
FIG. 23 is a diagram (part 1) for explaining the A/D conversion of a photodiode output in the system of FIG. 22.

First, for an input to the algorithm, $\{i_k\}$ (k=1, . . . , n−1) indicates the quantization interval (sequence) at which to quantize the photo current amount. The quantization interval $\{i_k\}$ is defined as shown in FIG. 23. That is, codes (digital values) n−k are assigned to the analog quantities of the photo current amounts $i_k$ to $i_{k-1}$.

In FIG. 23, the subscript on the photo current amount i is defined such that a larger value indicates a smaller light amount, meaning that the amount of the photo current flowing in the photodiode (34) is small, and conversely a smaller value indicates a larger light amount, meaning that the amount of the photo current flowing in the photodiode is large. The reason that the subscript on the photo current amount i is defined as described above is to indicate correspondence with $t_k$ and $V_k$ that take subscripts in the order of time. However, $i_n$ and $i_0$ are fixed to 0 and ∞, respectively.

Next, for an output from the algorithm, $\{t_k\}$ (k=1, . . . , n−1) indicates the time at which to read out the output of the photo detector circuit (PD), and $\{V_k\}$ (k=1, . . . , n−1) indicates the voltage to be applied as Vref at each $t_k$. Here, $t_0$ is fixed to 0.

As for other parameters, $\Delta V$ indicates the granularity of the value that can be input as the reference voltage Vref, $\Delta t$ the granularity of the PD readout time, $t_{max}$ the time required for A/D conversion [integral multiple of $\Delta t$], and $\{P_k\}$ (k=1, . . . , n−1) the time required to carry out the earlier described steps i) to iii) [integral multiple of $\Delta t$]. Further, Vdd is the photodiode reset voltage (supply voltage), $V_{max}$ is the maximum value (the upper limit of the comparator's operating range) that can be input as the reference voltage Vref [integral multiple of $\Delta V$], $V_{min}$ is the minimum value (the lower limit of the comparator's operating range) that can be input as the reference voltage Vref [integral multiple of $\Delta V$], and C is the capacitance of the photodiode.

For the algorithm, first the values are determined for the case of k=n−1. Then, using the results, the values are determined for the case of k=n−2, and the values are sequentially determined in like manner until k=1. If the process terminates with an error halfway, that means that the value of $\{i_k\}$ given as an input is unrealizable because of hardware constraints. The values thus determined are plotted in FIG. 24. For the convenience of description, it is assumed that $t_n=t_{max}$ and $V_n=V_{max}$.

Figure 24:
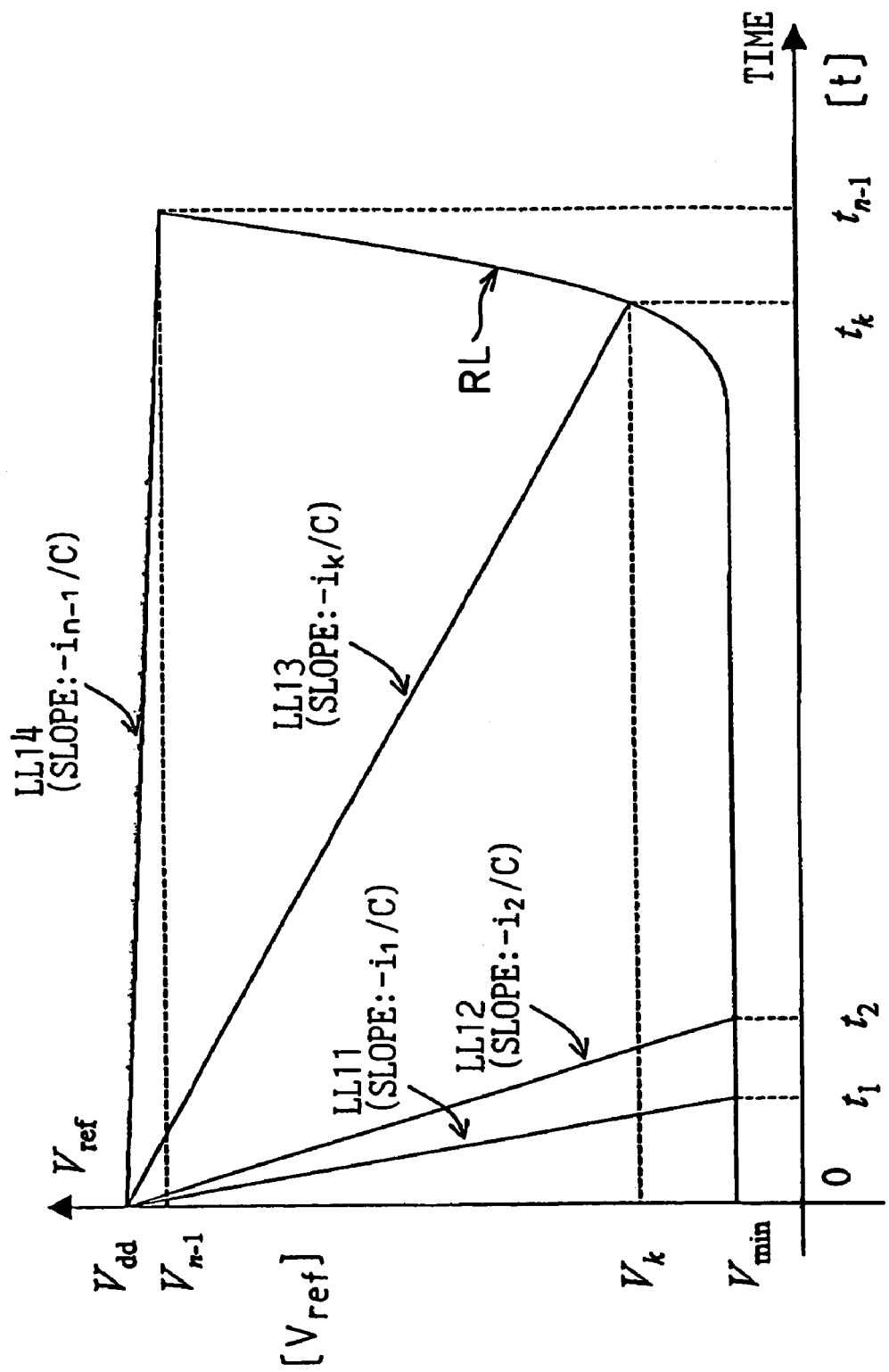
FIG. 24 is a diagram (part 2) for explaining the A/D conversion of the photodiode output in the system of FIG. 22.

In FIG. 24, reference characters LL11 to LL14 each show the time versus output voltage relationship, LL11 representing the relationship when the intensity of light falling on the photodiode (34) is the highest (brightest) and LL14 when the intensity of light is the lowest (darkest); the slope of LL11 is $-i_1/C$, the slope of LL12 is $-i_2/C$, the slope of LL13 is $-i_k/C$, and the slope of LL14 is $-i_{n-1}/C$.

Either of the following processes is performed in the order of k=n−1, n−2, ..., 1.

The process (A) is performed when $V_{k+1} \neq V_{min}$.

The process (B) is performed when $V_{k+1} = V_{min}$.

The processes (A) and (B) are as follows:

The process (A) carries out the following calculation.

$$t_k = t_{k+1} - P_k$$

$$V_k = \Delta V \left\lfloor \left(V_{dd} - \frac{i_k t_k}{C}\right) / \Delta V \right\rfloor$$

However, when $V_k > V_{k+1}$, the process terminates with an error. When $V_k < V_{min}$, recalculation is performed in the process (B).

The process (B) carries out the following calculation.

$$V_k = V_{min}$$

$$t_k = \Delta t \left\lfloor \frac{C(V_{dd} - V_{min})}{i_k \Delta t} \right\rfloor$$

However, when $t_{k+1} - t_k < P_k$, the process terminates with an error.

In this way, the PD readout time $\{t_k\}$ and the reference voltage $V_{ref}$ $\{V_k\}$ that achieve the desired photo current amount quantization interval $\{i_k\}$ are given as shown by the curve RL in FIG. 24, in accordance with which the A/D conversion can be accomplished. Further, by dynamically changing the contents of the PD readout time/supply voltage table 41, sensing adapted to changes in environment or purpose can be achieved.

Figure 25A:
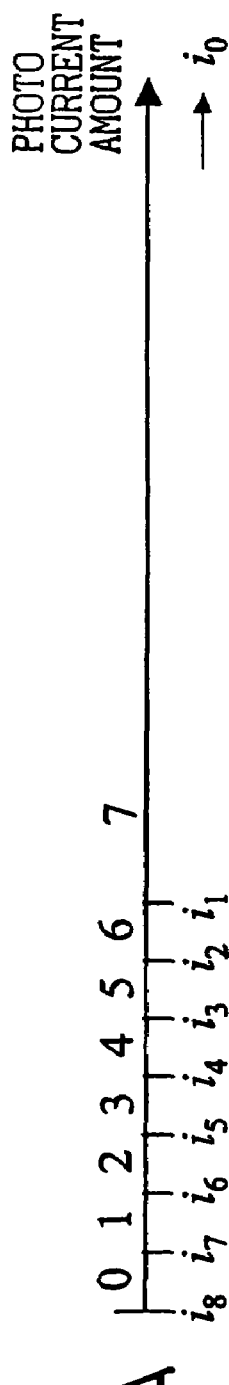
FIGS. 25A, 25B, 25C, and 25D are diagrams (part 3) for explaining the A/D conversion of the photodiode output in the system of FIG. 22.
Figure 25B:
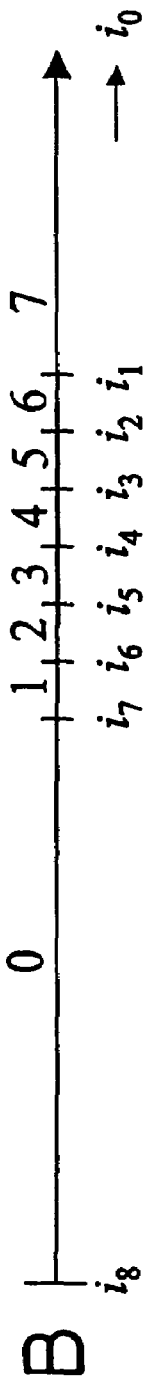

Examples of how the photo current amount quantization interval $\{i_k\}$ is given are illustrated in FIGS. 25A to 25B. For simplicity of explanation, 8-step A/D conversion is shown here.

First, FIG. 25A shows an example in which a dark area is A/D converted with small step size (an example suited to enhance the detection accuracy in an area where the intensity of light falling on the photodiode 34 is low), and FIG. 25B, on the other hand, shows an example in which a bright area is A/D converted with small step size (an example suited to enhance the detection accuracy in an area where the intensity of light falling on the photodiode 34 is high).

Figure 25C:
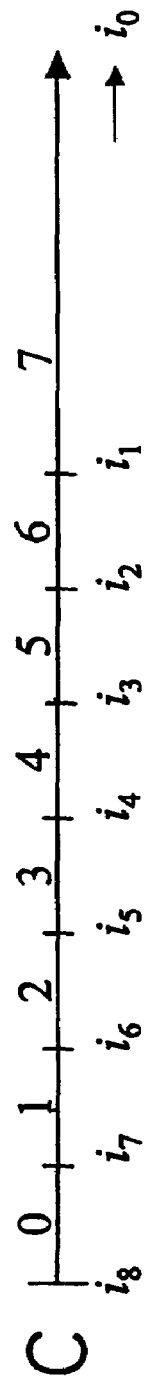

FIG. 25C is an example in which the step width is increased to cover a dark area as well as a bright area. However, in the example of FIG. 25C, the dynamic range is the same as that in the example of FIG. 25A because the lower limit as well as the upper limit of the detectable range is doubled.

Figure 25D:
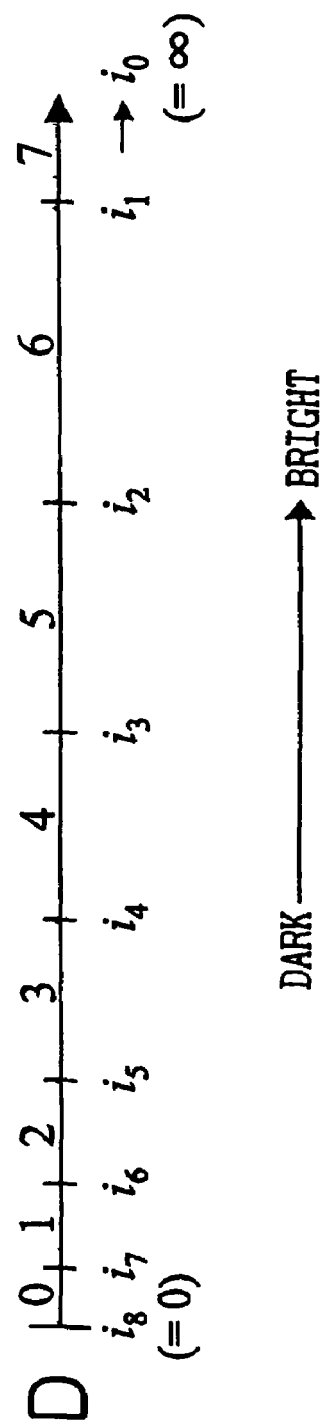

FIG. 25D is an example that achieves a wide dynamic range by increasing the step width as the light intensity increases. In the example of FIG. 25D, this is achieved at the expense of the linear relationship between the input light intensity and the A/D converted value.

According to the semiconductor integrated circuit device pursuant to the second embodiment of the present invention, proper control can be performed with respect to light intensity and noise to match the system (apparatus) to which the vision chip is applied, as shown in FIGS. 25A to 25D, and the detection accuracy can be enhanced where necessary.

The above description has been given by taking a vision chip as an example of the semiconductor integrated circuit device to which the present invention can be applied, but the invention is not limited to vision chips; rather, the invention can be applied broadly to any semiconductor integrated circuit device in which a plurality of processing elements (PE's) are formed on a single semiconductor chip.

As described in detail above, according to the first embodiment of the present invention, a semiconductor integrated circuit device can be provided that has high versatility without entailing a reduction in the number of pixels (without entailing an increase in the area occupied by each PE). Further, according to the second embodiment of the present invention, a semiconductor integrated circuit device can be provided that can accomplish A/D conversion of the outputs of photo detector elements without requiring additional circuitry, and can achieve flexible sensing.

Many different embodiments of the present invention may be constructed without departing from the spirit and scope of the present invention, and it should be understood that the present invention is not limited to the specific embodiments described in this specification, except as defined in the appended claims.

What is claimed is:

1. A semiconductor integrated circuit device having a plurality of photo detector circuits and a plurality of processing elements, each provided for a corresponding one of said photo detector circuits, wherein each of said photo detector circuits includes a comparing circuit comparing an output of a photo detector element with a reference voltage, and A/D conversion is performed by counting a time elapsing until the output of said photo detector element drops below said reference voltage, and a level of said reference voltage as a function of time to be applied to said comparing circuit and time intervals of said counting are uniquely determined based on given quantization intervals of an amount of current generated by said photo detector element.

2. The semiconductor integrated circuit device as claimed in claim 1, wherein the level of said reference voltage to be applied to said comparing circuit is variably controlled by software.

3. The semiconductor integrated circuit device as claimed in claim 1, wherein the level of said reference voltage to be applied to said comparing circuit is specified based on a predefined table.

4. The semiconductor integrated circuit device as claimed in claim 1, wherein said A/D conversion is performed using an ALU and a memory contained in each of said processing elements.

5. The semiconductor integrated circuit device as claimed in claim 1, wherein said semiconductor integrated circuit device is a vision chip, and each of said processing elements is coupled to a corresponding one of said plurality of photo detector circuits.

6. The semiconductor integrated circuit device as claimed in claim 1, wherein said semiconductor integrated circuit device is constructed as a single semiconductor chip.

7. A semiconductor integrated circuit device having a plurality of photo detector circuits, a plurality of reset circuits, and a plurality of processing elements, each provided for a corresponding one of the plurality of photo detector circuits, wherein each of said plurality of photo detector circuits includes a respective one of a plurality of photo detector elements, and a comparing circuit comparing an output of said respective one of the plurality of photo detector elements with a reference voltage, A/D conversion is performed by counting a time elapsing until the output of said respective one of said plurality of photo detector elements drops below said reference voltage, each of said plurality of reset circuits being configured to reset a respective one of the plurality of photo detector elements in response to a corresponding one of a plurality of reset signals, each of the plurality of reset signals being selectively applied to a respective one of the plurality of reset circuits based on a result of a computation of the corresponding one of said processing elements.

* * * * *